(12) United States Patent
Tangudu et al.

(10) Patent No.: US 11,646,633 B2
(45) Date of Patent: May 9, 2023

(54) AIRCRAFT ELECTRIC MOTOR

(71) Applicant: Hamilton Sundstrand Corporation, Charlotte, NC (US)

(72) Inventors: Jagadeesh Kumar Tangudu, South Windsor, CT (US); Huan Zhang, Glastonbury, CT (US); Zaffir A. Chaudhry, South Glastonbury, CT (US); Andrzej Ernest Kuczek, Bristol, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 111 days.

(21) Appl. No.: 17/223,511

(22) Filed: Apr. 6, 2021

(65) Prior Publication Data

US 2022/0320957 A1  Oct. 6, 2022

(51) Int. Cl.
*H02K 7/116* (2006.01)
*H02K 1/20* (2006.01)
*H02K 1/30* (2006.01)
*B64D 27/24* (2006.01)

(52) U.S. Cl.
CPC ............ *H02K 7/116* (2013.01); *B64D 27/24* (2013.01); *H02K 1/20* (2013.01); *H02K 1/30* (2013.01)

(58) Field of Classification Search
CPC . H02K 9/12; H02K 7/116; H02K 1/20; H02K 1/30
USPC ............ 310/156.7, 156.12, 156.59, 265, 266
See application file for complete search history.

(56) References Cited

U.S. PATENT DOCUMENTS

| | | | |
|---|---|---|---|
| 5,829,542 A | 11/1998 | Lutz | |
| 7,626,298 B2 | 12/2009 | Atarashi | |
| 2012/0235606 A1 | 9/2012 | Takeuchi | |
| 2013/0062466 A1 | 3/2013 | Sweet et al. | |

FOREIGN PATENT DOCUMENTS

| | | | | |
|---|---|---|---|---|
| CN | 1685589 A | * | 10/2005 | ........... H02K 1/2786 |
| CN | 200953512 Y | | 9/2007 | |
| CN | 101199103 A | * | 6/2008 | ............. H02K 1/278 |
| CN | 201787029 U | | 4/2011 | |
| CN | 102130565 A | | 7/2011 | |
| CN | 202085025 U | | 12/2011 | |
| CN | 110380555 A | * | 10/2019 | ........... H02K 1/2753 |

(Continued)

OTHER PUBLICATIONS

Europeaan Search Report for European Application No. 22160795.5; dated Sep. 9, 2022; 11 pages.

*Primary Examiner* — Jose A Gonzalez Quinones
(74) *Attorney, Agent, or Firm* — Cantor Colburn LLP

(57) ABSTRACT

Aircraft electric motors are described. The electric motors include a substantially annular shaped motor housing having an outer wall and an inner wall, wherein a rotor-stator cavity is defined between the outer wall and the inner wall and a gear assembly cavity is defined radially inward from the inner wall and a gear assembly arranged within the gear assembly cavity. The gear assembly includes a sun gear operably connected to a first shaft, at least one planetary gear arranged radially outward from the sun gear and rotationally engaged with the sun gear, and a ring gear arranged radially outward from the at least one planetary gear and rotationally engaged with the at least one planetary gear, wherein the ring gear is operably connected to a second shaft.

17 Claims, 19 Drawing Sheets

(56) References Cited

FOREIGN PATENT DOCUMENTS

| | | | |
|---|---|---|---|
| CN | 112247044 A | 1/2021 | |
| DE | 29811132 U1 | 9/1998 | |
| JP | 2004120932 A | 4/2004 | |
| JP | 2005186667 A | 7/2005 | |
| JP | 2009303378 A | 12/2009 | |
| JP | 2010091095 A | 4/2010 | |
| JP | 2020063783 A | 4/2020 | |
| WO | WO-2014116079 A1 * | 7/2014 | ........... D06F 37/206 |
| WO | WO-2016186353 A1 * | 11/2016 | ............ D06F 37/12 |
| WO | 2019235953 A1 | 12/2019 | |

* cited by examiner

AIRCRAFT ELECTRIC MOTOR

BACKGROUND

The present disclosure relates to electric motors, and more particularly, to electric motor assemblies with high efficiency and power density with a light weight for aircraft applications.

Traditional electric motors may include a stator and a rotor, with electrical motor windings in the stator that, when energized, drive rotation of the rotor about a central axis. Heat is generated in the motor windings, which are located in slots in the stator. The windings are separated from the exterior of the motor by layers of insulation and laminated steel, which makes up the stator. These contributors to internal thermal resistance limit the allowable heat generation and thus the allowable electrical current in the windings. The energy density of an electric motor is typically limited by heat dissipation from the motor windings of the stator. The requirement to be met is a maximum hot spot temperature in the motor windings that is not to be exceeded. Conventional motor thermal management includes natural convection from large fins on the outside of a motor jacket, or liquid cooling in the motor jacket. Both of these solutions undesirably add volume and/or weight to the motor, due to the addition of, at least, the jacket.

BRIEF DESCRIPTION

According to some embodiments of the present disclosure, aircraft electric motors are provided. The aircraft electric motors include a substantially annular shaped motor housing having an outer wall and an inner wall, wherein a rotor-stator cavity is defined between the outer wall and the inner wall and a gear assembly cavity is defined radially inward from the inner wall and a gear assembly arranged within the gear assembly cavity. The gear assembly includes a sun gear operably connected to a first shaft, at least one planetary gear arranged radially outward from the sun gear and rotationally engaged with the sun gear, and a ring gear arranged radially outward from the at least one planetary gear and rotationally engaged with the at least one planetary gear, wherein the ring gear is operably connected to a second shaft.

In addition to one or more of the features described herein, or as an alternative, further embodiments of the aircraft electric motors may include an annular rotor sleeve arranged within the rotor-stator cavity, the rotor sleeve having an inner wall, a connecting wall, and an outer wall, wherein the inner wall, the connecting wall, and the outer wall define a U-shaped channel configured to receive a U-shaped magnet structure and a sleeve inner cavity defined radially inward from the inner wall. The gear assembly is arranged within the sleeve inner cavity.

In addition to one or more of the features described herein, or as an alternative, further embodiments of the aircraft electric motors may include that the rotor sleeve further comprises a hub connector extending radially inward from the inner wall into the sleeve inner cavity. The aircraft electric motor further includes a hub arranged in the sleeve inner cavity and fixedly connected to the hub connector, wherein the hub is configured to rotate with rotation of the rotor sleeve.

In addition to one or more of the features described herein, or as an alternative, further embodiments of the aircraft electric motors may include that the hub is formed from composite materials.

In addition to one or more of the features described herein, or as an alternative, further embodiments of the aircraft electric motors may include that the hub comprises a plurality of spokes extending between an inner element and an outer element, wherein the outer element is configured to engage with the rotor sleeve and the inner element is configured to engage with the first shaft.

In addition to one or more of the features described herein, or as an alternative, further embodiments of the aircraft electric motors may include a U-shaped magnet structure arranged within the U-shaped channel of the rotor sleeve.

In addition to one or more of the features described herein, or as an alternative, further embodiments of the aircraft electric motors may include that the rotor sleeve is formed from composite material.

In addition to one or more of the features described herein, or as an alternative, further embodiments of the aircraft electric motors may include that the rotor sleeve is formed from two pieces, with a first piece formed of a first material and the second piece formed of a second material different from the first material.

In addition to one or more of the features described herein, or as an alternative, further embodiments of the aircraft electric motors may include a stator and a rotor arranged within the rotor-stator cavity of the motor housing.

In addition to one or more of the features described herein, or as an alternative, further embodiments of the aircraft electric motors may include that the rotor is operably connected to the first shaft to drive rotation of the sun gear.

In addition to one or more of the features described herein, or as an alternative, further embodiments of the aircraft electric motors may include that the rotor comprises a U-shaped magnet structure.

In addition to one or more of the features described herein, or as an alternative, further embodiments of the aircraft electric motors may include that the stator is arranged within the U-shaped magnet structure.

In addition to one or more of the features described herein, or as an alternative, further embodiments of the aircraft electric motors may include that the motor housing includes gear shafts within the gear assembly cavity, the gear shafts configured to support gears of the gear assembly.

In addition to one or more of the features described herein, or as an alternative, further embodiments of the aircraft electric motors may include that the at least one planetary gear is supported on one of the gear shafts.

In addition to one or more of the features described herein, or as an alternative, further embodiments of the aircraft electric motors may include that the first shaft is an input shaft configured to drive rotation of the sun gear and the second shaft is an output shaft configured to be rotationally driven by rotation of the ring gear.

In addition to one or more of the features described herein, or as an alternative, further embodiments of the aircraft electric motors may include that the second shaft is operably connected to a fan of the aircraft.

In addition to one or more of the features described herein, or as an alternative, further embodiments of the aircraft electric motors may include that the first shaft is rotationally supported on at least one first bearing and the second shaft is rotationally supported on at least one second bearing.

In addition to one or more of the features described herein, or as an alternative, further embodiments of the aircraft electric motors may include that at least a portion of the gear assembly is formed from symmetric low density, high strength composites.

In addition to one or more of the features described herein, or as an alternative, further embodiments of the aircraft electric motors may include that at least one of the sun gear, the at least one planetary gear, and the ring gear are formed of a bi-metal construction.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

DETAILED DESCRIPTION

Figure 1A:
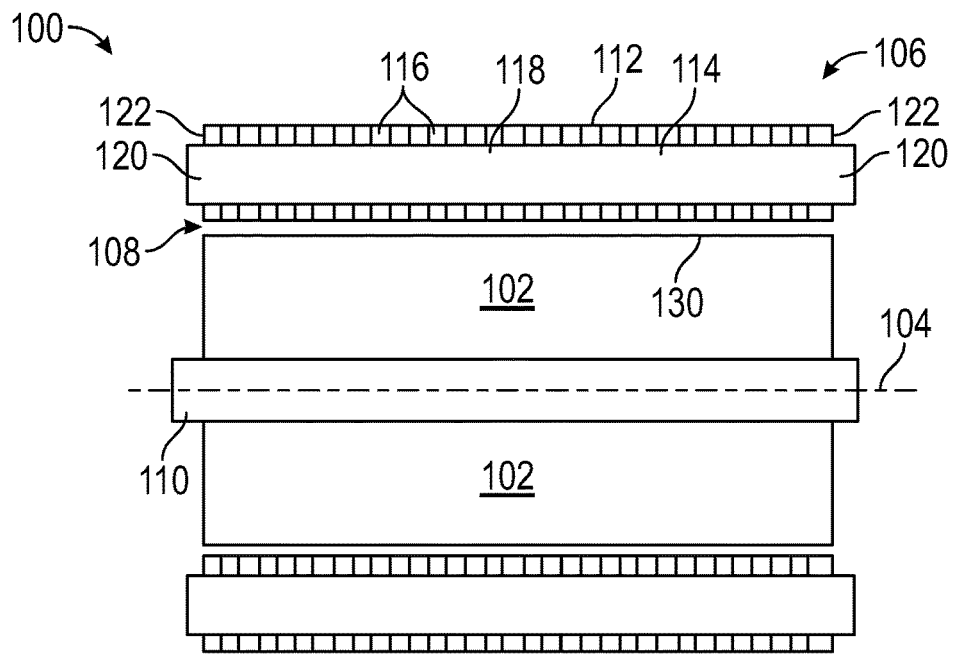
FIG. 1A is a partial view of an embodiment of electric motor.
Figure 1B:
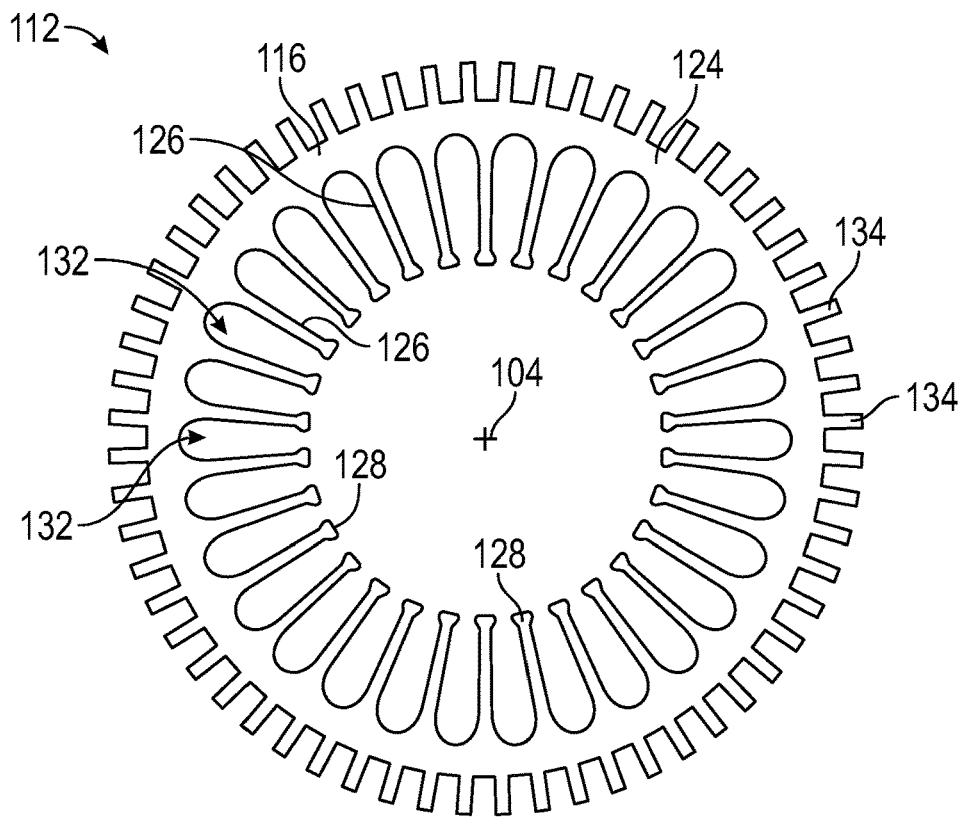
FIG. 1B is a cross-sectional view of an embodiment of a stator core of the electric motor of FIG. 1A.

Referring to FIGS. 1A-1B, schematic illustrations of an electric motor 100 that may incorporate embodiments of the present disclosure are shown. FIG. 1A illustrates a cross-sectional view of the electric motor 100 and FIG. 1B illustrates a cross-sectional view of a stator core of the electric motor 100. The electric motor 100 includes a rotor 102 configured to rotate about a rotation axis 104. A stator 106 is located radially outboard of the rotor 102 relative to the rotation axis 104, with a radial air gap 108 located between the rotor 102 and the stator 106. As illustrated, the rotor 102 may be mounted on a shaft 110 which may impart rotational movement to the rotor 102 or may be driven by rotation of the rotor 102, as will be appreciated by those of skill in the art. The rotor 102 and the shaft 110 may be fixed together such that the rotor 102 and the shaft 110 rotate about the rotation axis 104 together as one piece.

The stator 106 includes a stator core 112 in which a plurality of electrically conductive stator windings 114 are disposed. In some embodiments, such as shown in FIG. 1A, the stator core 112 is formed from a plurality of axially stacked laminations 116, which are stacked along the rotation axis 104. In some embodiments, the laminations 116 are formed from a steel material, but one skilled in the art will readily appreciate that other materials may be utilized. The stator windings 114, as shown, include core segments 118 extending through the stator core 112 and end turn segments 120 extending from each axial stator end 122 of the stator core 112 and connecting circumferentially adjacent core segments 118. When the stator windings 114 are energized via an electrical current therethrough, the resulting field drives rotation of the rotor 102 about the rotation axis 104. Although FIG. 1A illustrates the stator core 112 arranged radially inward from the stator windings 114, it will be appreciated that other configurations are possible without departing from the scope of the present disclosure. For example, in some embodiments, the stator structure may be arranged radially inward from a rotating rotor structure.

FIG. 1B is an axial cross-sectional view of the stator core 112. Each lamination 116 of the stator core 112 includes a radially outer rim 124 with a plurality of stator teeth 126 extending radially inwardly from the outer rim 124 toward the rotation axis 104. Each of the stator teeth 126 terminate at a tooth tip 128, which, together with a rotor outer surface 130 (shown in FIG. 1A) of the rotor 102, may define the radial air gap 108. Circumferentially adjacent stator teeth 126 define an axially-extending tooth gap 132 therebetween. Further, in some embodiments, a plurality of stator fins 134 extend radially outwardly from the outer rim 124.

Electric motors, as shown in FIGS. 1A-1B may require cooling due to high density configurations, various operational parameters, or for other reasons. For example, high-power-density aviation-class electric motors and drives may require advanced cooling technologies to ensure proper operation of the motors/drives. These machines are generally thermally limited at high power ratings and their performance can be improved by mitigating thermal limitations. To maintain desired temperatures, a thermal management system (TMS) is integrated into the system, which provides cooling to components of the system. Onboard an aircraft, power requirements, and thus thermal management system (TMS) loads, are substantially higher during takeoff. Sizing of the TMS for takeoff conditions (i.e., maximum loads) results in a TMS having a high weight to accommodate such loads. This results in greater weight and lower power density during cruise conditions which do not generate such loads, and thus does not require a high cooling capacity TMS. Balancing weight constraints and thermal load capacities is important for such aviation applications.

In view of such considerations, improved aviation electric motors are provided herein. The aviation electric motors or aircraft electric motors, described herein, incorporate lightweight materials and compact design to reduce weight, improve thermal efficiencies, improve power efficiencies, and improve power density.

Figure 2A:
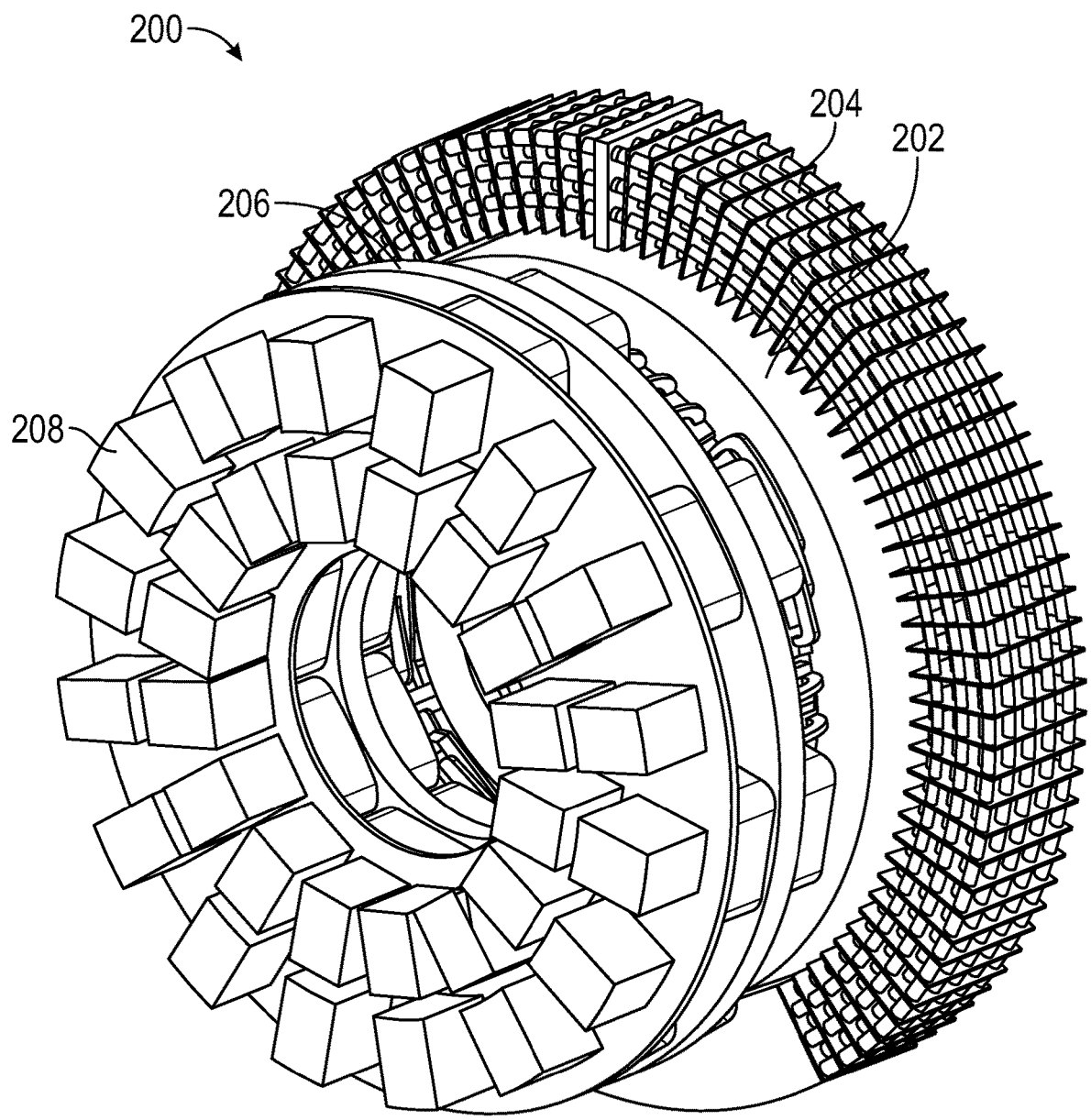
FIG. 2A is a schematic illustration of an aircraft electric motor in accordance with an embodiment of the present disclosure.
Figure 2B:
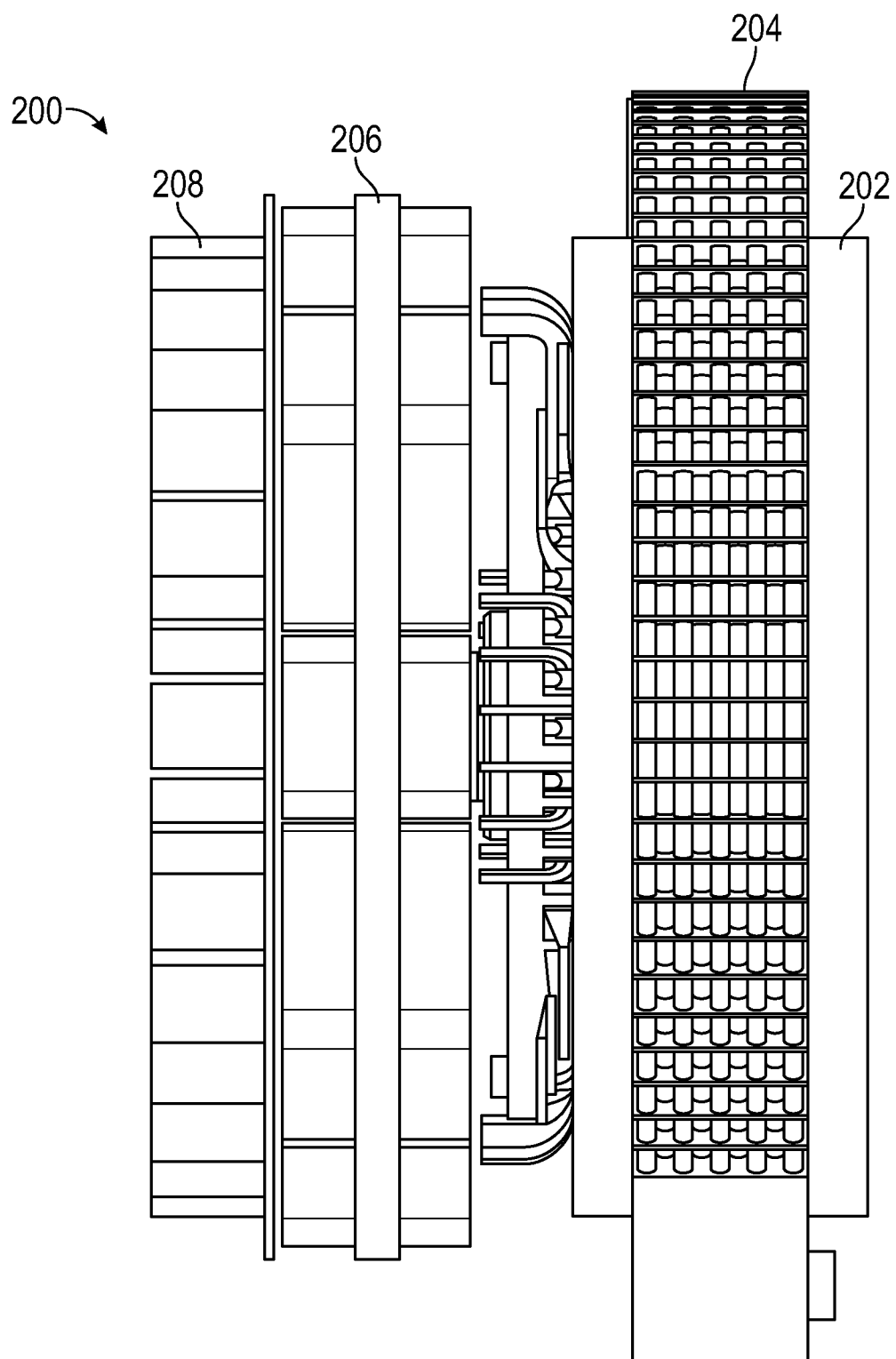
FIG. 2B is a side elevation view of the aircraft electric motor of FIG. 2A.
Figure 2C:
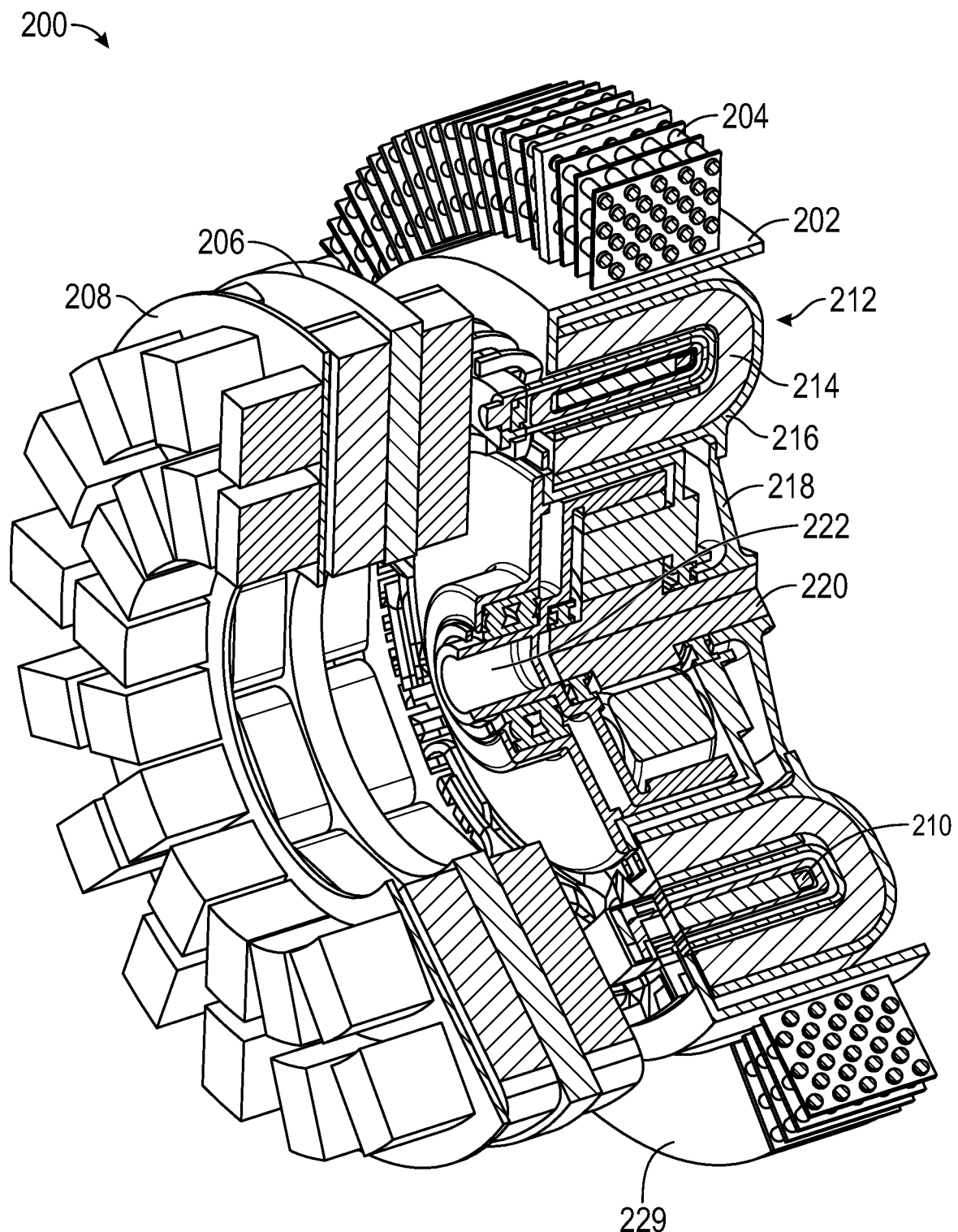
FIG. 2C is a partial cut-away illustration of the aircraft electric motor of FIG. 2A.
Figure 2D:
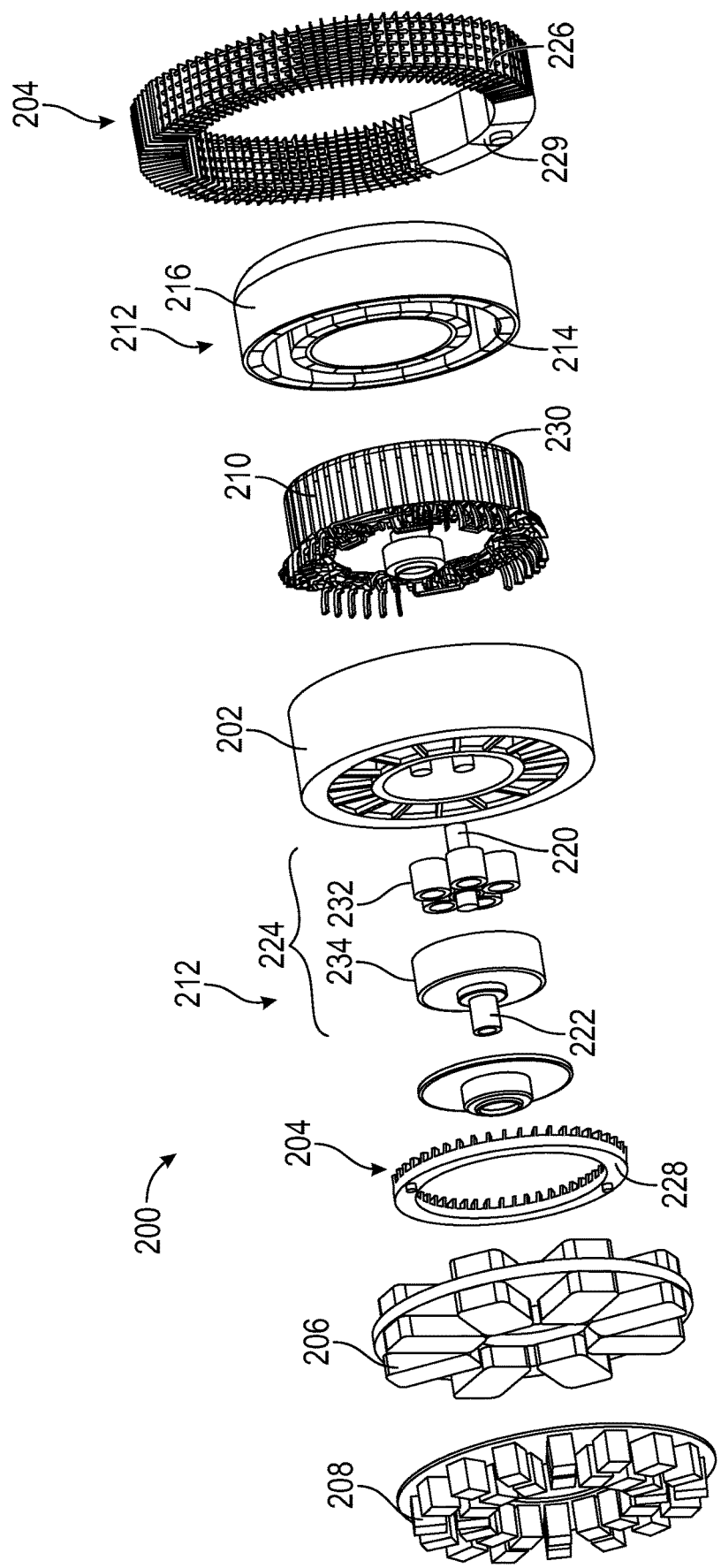
FIG. 2D is a separated-component illustration of the aircraft electric motor of FIG. 2A.

Turning now to FIGS. 2A-2D, schematic illustrations of an aircraft electric motor 200 in accordance with an embodiment of the present disclosure are shown. FIG. 2A is an isometric illustration of the aircraft electric motor 200, FIG. 2B is a side elevation view of the aircraft electric motor 200, FIG. 2C is a partial cut-away view illustrating internal components of the aircraft electric motor 200, and FIG. 2D is a schematic illustration of components of the aircraft electric motor 200 as separated from each other. The aircraft electric motor 200 includes a motor housing 202, a cooling system 204, a first power module system 206, and a second power module system 208.

The motor housing 202 houses a stator 210 and a rotor 212, with the rotor 212 configured to be rotatable about the stator 210. In this illustrative embodiment, the rotor 212 includes a U-shaped magnet 214 arranged within a similarly shaped U-shaped rotor sleeve 216. The rotor sleeve 216 is operably connected to a hub 218. The hub 218 is fixedly attached to a first shaft 220. The first shaft 220 is operably connected to a second shaft 222. In some configurations, the first shaft 220 may be a high speed shaft and may be referred to as an input shaft. In such configurations, the second shaft 222 may be a low speed shaft and may be referred to as an output shaft. The connection between the first shaft 220 and the second shaft 222 may be by a gear assembly 224, as described herein.

The cooling system 204 is configured to provide cooling to the components of the aircraft electric motor 200. The cooling system 204, as shown in FIG. 2D, includes a heat exchanger 226 and a header 228. The heat exchanger 226 and the header 228 may form a closed-loop cooling system that may provide air-cooling to a working fluid at the heat exchanger 226. The header 228 may be, in some configurations, a two-phase di-electric cooling header. A cooled working fluid may be pumped from the heat exchanger 226 into the header 228 using a pump 229 and distributed into embedded cooling channels 230 that are arranged within the stator 210. As the aircraft electric motor 200 is operated, heat is generated and picked up by the working fluid within the embedded cooling channels 230. This heated working fluid is then passed through the header 228 back to the heat exchanger 226 to be cooled, such as by air cooling. Although described as air-cooling, other cooling processes may be employed without departing from the scope of the present disclosure.

As shown, the heat exchanger 226 of the cooling system 204 may be a circular structure that is arranged about the motor housing 202. This configuration and arrangement allows for improved compactness of the system, which may be advantageous for aircraft applications. The rotor sleeve 216 with the magnets 214, the stator 210, and the gear assembly 224 fit together (although moveable relative to each other) within the motor housing 202, providing for a compact (low volume/size) design.

As noted above, the rotor sleeve 216 may be operably coupled to a first shaft 220 by the hub 218. The first shaft 220 may be operably coupled to a first gear element 232 and the second shaft 222 may be operably coupled to a second gear element 234. The first and second gear elements 232, 234 may form the gear assembly 224. The first and second gear elements 232, 234 are arranged to transfer rotational movement from the first shaft 220, which is driven in rotation by the hub 218 and the rotor sleeve 216 of the rotor 212, to the second shaft 222. In some embodiments, the first shaft 220 may be operably connected to a sun gear as the first gear element 232 that engages with a plurality of planetary gears and drives rotation of the second gear element 234 which may be operably connected to the second shaft 222. In some embodiments, the second shaft 222 may be connected to a fan or other component to be rotated by the aircraft electric motor 200.

The aircraft electric motor 200 includes the first power module system 206 and the second power module system 208. The first and second power module systems 206, 208 can include capacitors and other electronics, including, but not limited to, printed circuit boards (PCBs) that may enable control and operation of the aircraft electric motor 200. Again, the profile of the aircraft electric motor 200 of the present disclosure presents a low profile or compact arrangement that reduces the volume of the entire power system, which in turn can provide for improved weight reductions. In some embodiments, the first and second power module systems 206, 208 may be electrically connected to the stator 210 to cause an electric current therein. As the electric current will induce an electromagnetic field which will cause the rotor 212 to rotate.

Figure 3A:
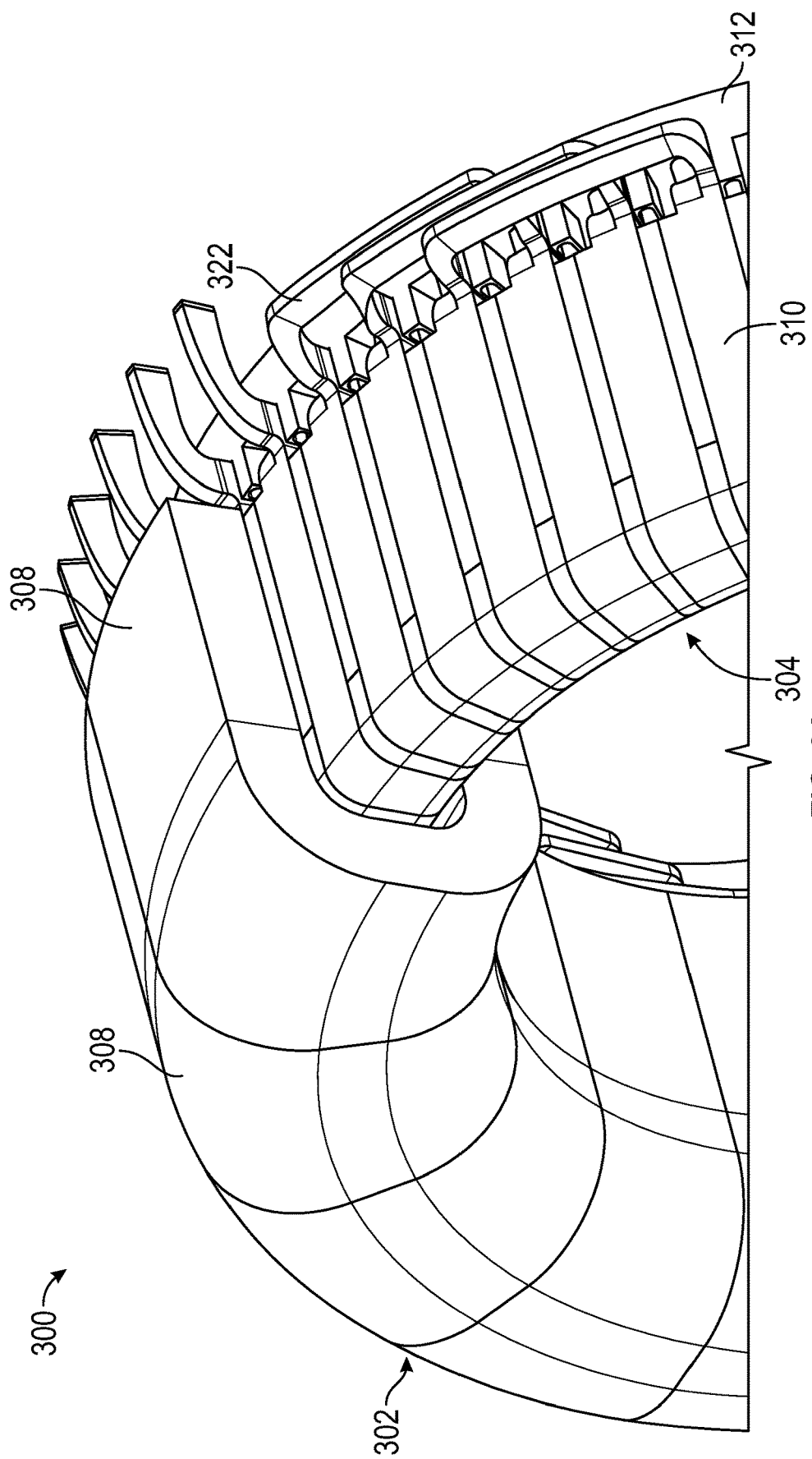
FIG. 3A is a schematic illustration of a rotor and stator of an aircraft electric motor in accordance with an embodiment of the present disclosure.
Figure 3B:
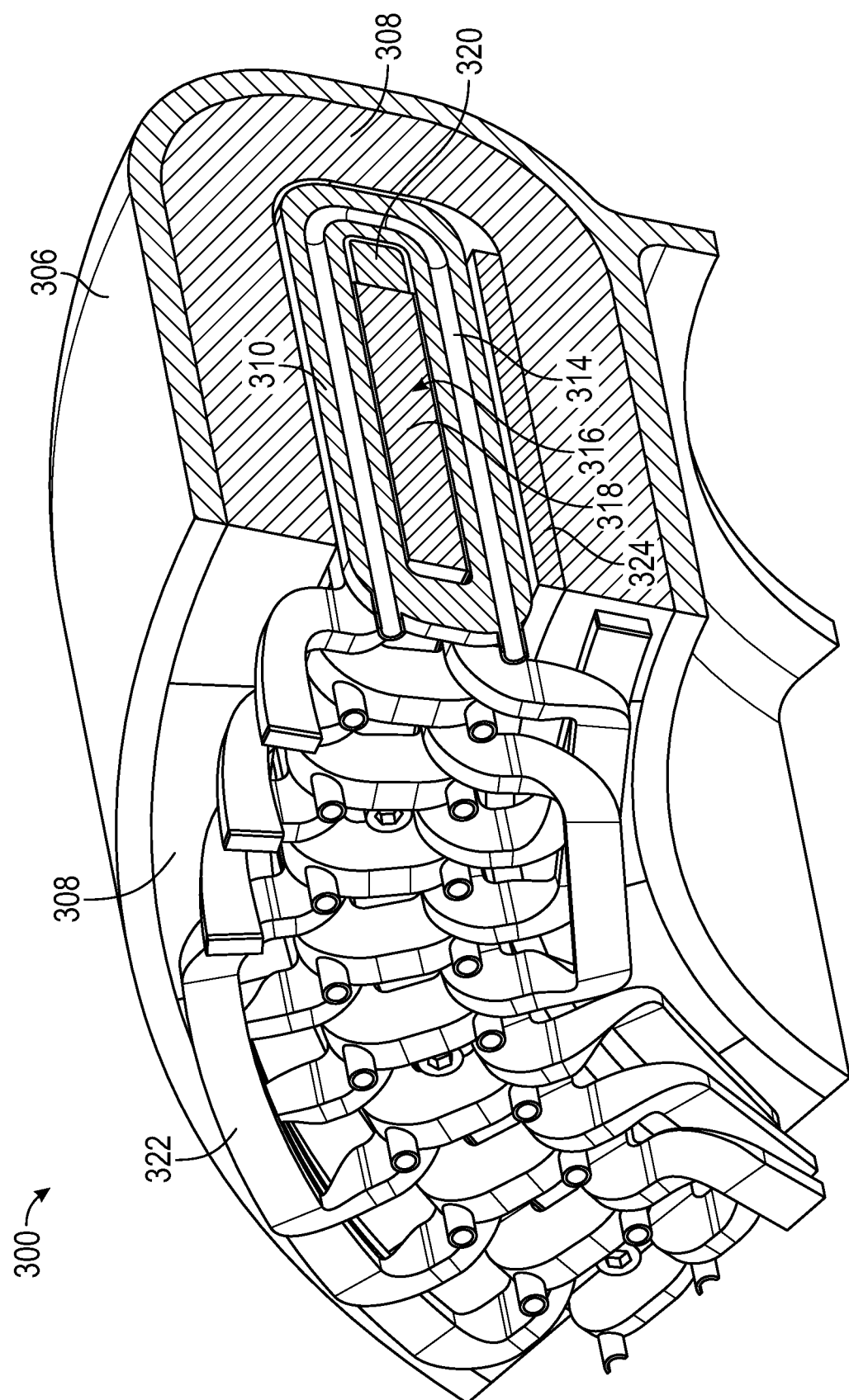
FIG. 3B is a schematic illustration of the rotor and stator of FIG. 3A as arranged within a rotor sleeve in accordance with an embodiment of the present disclosure.

Referring now to FIGS. 3A-3B, schematic illustrations of a portion of an aircraft electric motor 300 in accordance with an embodiment of the present disclosure is shown. FIGS. 3A-3B illustrate a portion of a rotor 302 and a stator 304 of the aircraft electric motor 300. FIG. 3A illustrates the rotor 302 and the stator 304 and FIG. 3B illustrates these components arranged within a rotor sleeve 306.

The rotor 302 is formed of a plurality of U-shaped magnets 308. In some configurations, the plurality of magnets 308 can be arranged with alternating polarity in a circular structure. Arranged within the "U" of the U-shaped magnets 308 is the stator 304. The stator 304 is formed of a plurality of windings 310. In this configuration, the windings 310 are arranged with a header 312. The header 312 may be part of a cooling system, such as that shown and described above. The header 312 can be configured to cycle a working fluid through cooling channels 314 for cooling of the windings 310, as shown in FIG. 3B.

The windings 310 may be wrapped about a support structure 316. The support structure 316, in some embodiments and as shown in FIG. 3B, may include a laminate portion 318 and a magnetic portion 320. In some embodiments, the laminate portion 318 may be formed from cobalt steel laminate and the magnetic portion 320 may be formed from a soft magnetic composite. The laminate portion 318 may be provided to capture in-plane flux from outer and inner rotor. The magnetic portion 320 may be provided to capture end rotor flux and may take a shape/filler in a gap through the end turns of the coil. The windings 308 include end connections 322 and may be electrically connected to one or more power module systems of the aircraft electric motor, such as shown above.

As shown in FIG. 3B, the magnets 306 are U-shaped and arranged within the rotor sleeve 306. The rotor sleeve 306 is a substantially U-shaped sleeve that is sized and shaped to receive the U-shaped magnets 308. In this illustrative configuration, the rotor sleeve 306 can include an inner sleeve 324. The inner sleeve 324 may be configured to provide support to a portion of the magnets 308. It will be appreciated that there is no direct contact between the windings 310 and the magnets 308. This lack of contact enables free rotation of the rotor 302 relative to the stator 304 during operation.

Figure 4:
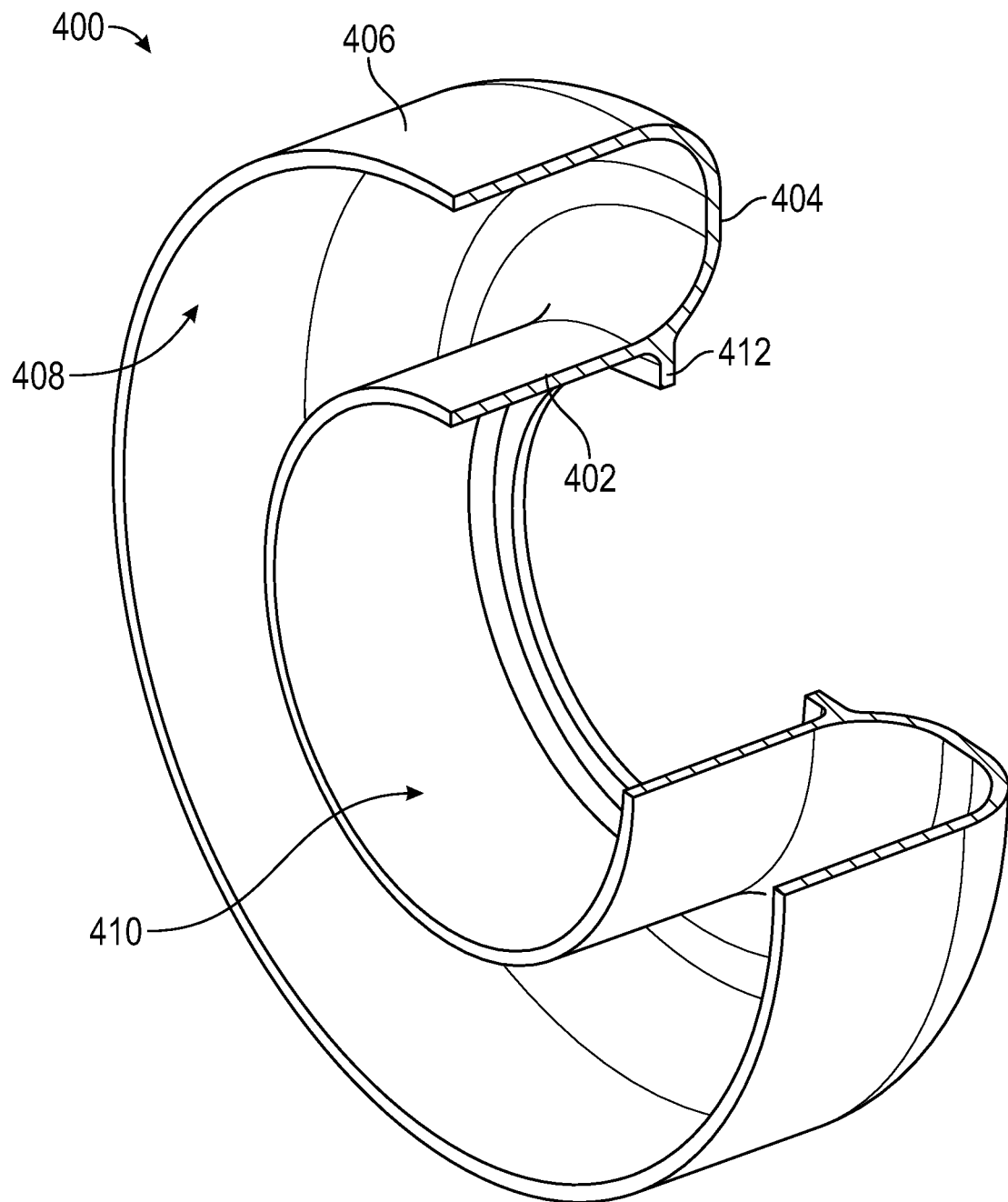
FIG. 4 is a schematic illustration of a rotor sleeve in accordance with an embodiment of the present disclosure.

Turning now to FIG. 4, a schematic illustration of a rotor sleeve 400 in accordance with an embodiment of the present disclosure is shown. The rotor sleeve 400 may be configured to house a U-shaped magnet structure of a rotor for an aircraft electric motor in accordance with the present disclosure. As shown, the rotor sleeve 400 is an annular structure or ring-shaped structure, allowing for components to be installed within the structure of the sleeve, and within the central bore or through hole of the annular structure. The rotor sleeve 400 includes an inner diameter wall 402, a connecting wall 404, and an outer diameter wall 406. The inner diameter wall 402, the connecting wall 404, and the outer diameter wall 406 define a U-shaped channel 408 for receiving a U-shaped magnet structure, as described above. The inner diameter wall 402 also defines a sleeve inner cavity 410. The sleeve inner cavity 410 is sized and shaped to receive a gear assembly such as that shown and described herein. The sleeve inner cavity 410 enables a compact configuration with the gearing of the aircraft electric motor being housed and arranged within (radially inward from) the rotor and stator of the motor.

Extending radially inward from at least one of the inner diameter wall 402 and the connecting wall 404 is a hub connector 412. The hub connector 412 allows for connection and attachment to a hub, which in turn can be operably connected to one or more shafts and the gear assembly arranged within the sleeve inner cavity 410, as shown and described herein.

The rotor sleeve 400, in accordance with some embodiments, may be formed with a compounded curvature. In some embodiments, the material of the rotor sleeve 400 may be formed from a highly drapeable composite sheet material, such as, carbon fiber fabrics, carbon fiber composites, and/or braided materials. In other embodiments, the rotor sleeve 400 may be formed from metal, such as and without limitation, titanium, titanium alloys, aluminum, aluminum alloys, iron, stainless steel, carbon composites, Inconel, etc., with a preference toward non-conductive materials. Furthermore, in some embodiments, combinations of metal and composite materials may be used, without departing from the scope of the present disclosure.

Figure 5A:
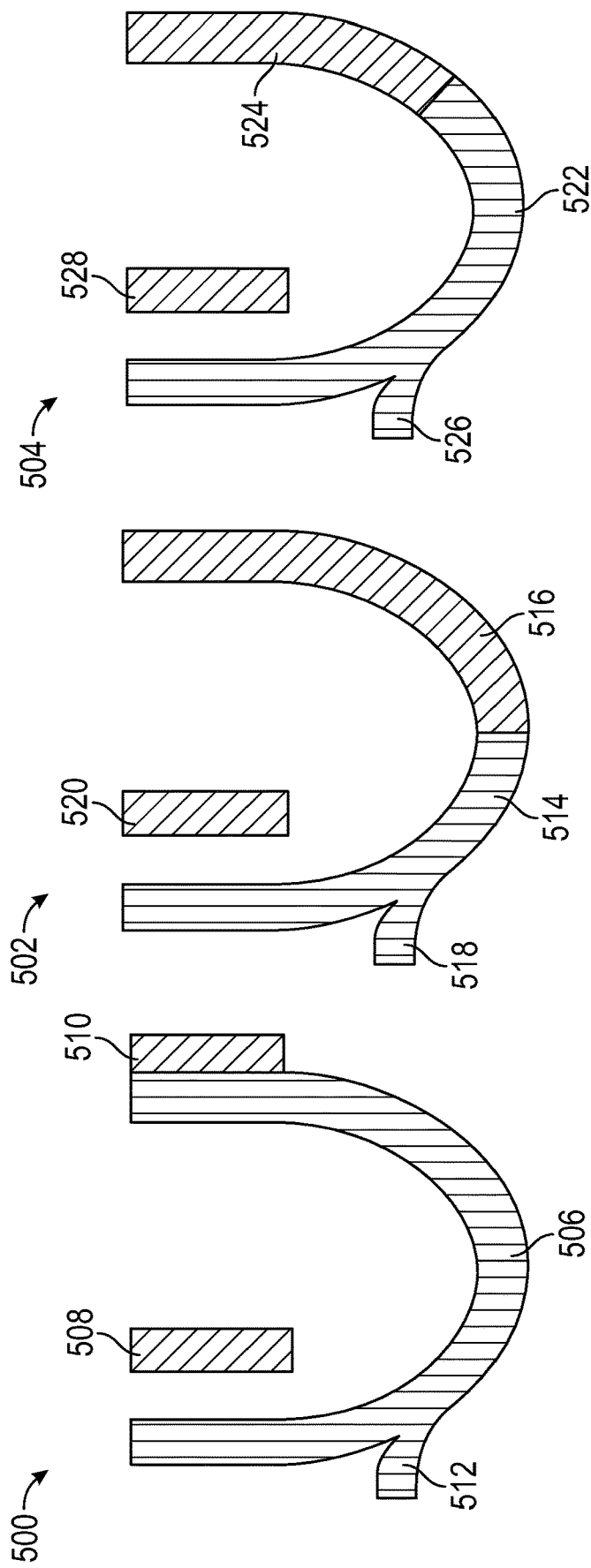
FIG. 5A is a set of different configurations of a rotor sleeve in accordance with an embodiment of the present disclosure.
Figure 5B:
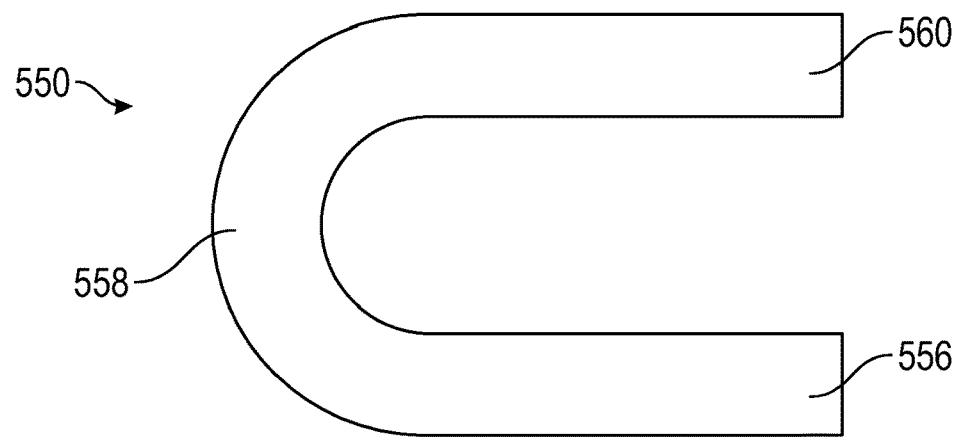
FIG. 5B is a set of different configurations of a rotor sleeve in accordance with an embodiment of the present disclosure.
Figure 5B:
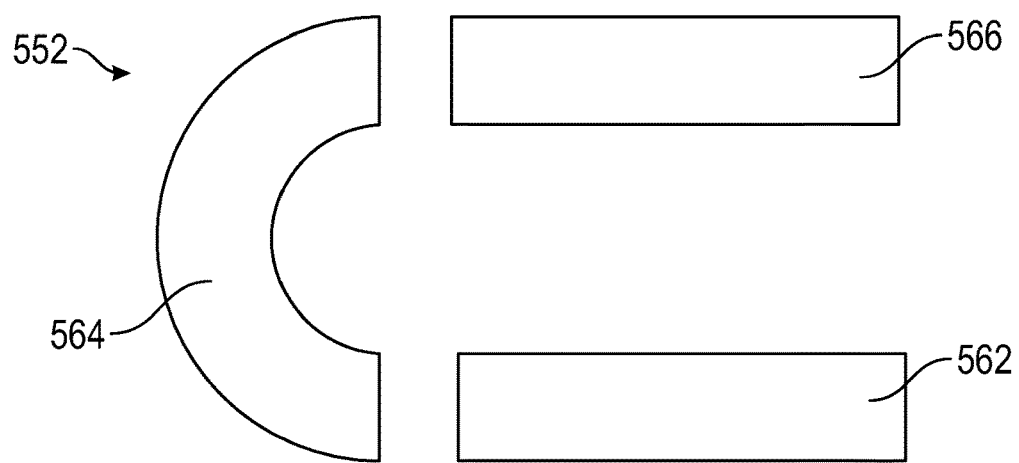
Figure 5B:
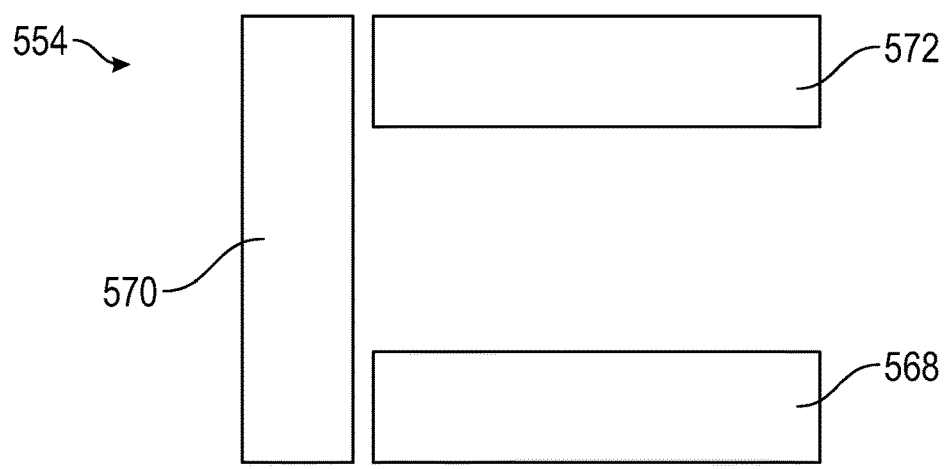

Turning now to FIGS. 5A-5B, schematic illustrations of different material arrangements for rotor sleeves in accordance with the present disclosure are shown. Each of the rotor sleeves 500, 502, 504 shown in FIG. 5A are configured to house a magnet assembly with substantially U-shaped magnets and include a hub flange extending therefrom. Each of rotor sleeves 550, 552, 554 shown in FIG. 5B illustrate different geometries and component arrangements of the rotor sleeves with the hub flanges omitted therefrom (although such hub flanges may be incorporated with these embodiments).

A first rotor sleeve 500 is formed of a unitary material 506, such as metal. In this illustrative configuration, the first rotor sleeve 500 includes an inner sleeve 508 which may be formed from a different material, such as carbon fiber composites. Additionally, in this illustrative configuration, an outer sleeve 510 is provided as a bounding sleeve to provide structural support due to the forces and stresses during rotation of the first rotor sleeve 500. The first rotor sleeve 500 also includes a hub flange 512. The hub flange 512 is configured to enable attachment to a hub, as shown and described herein, such as by welding or other attachment means.

A second rotor sleeve 502, shown in FIG. 5A, is formed from two separate materials. In this configuration, the second rotor sleeve 502 includes a first material portion 514 and a second material portion 516. In a non-limiting embodiment, the first material portion 514 may be formed from metal and the second material portion 516 may be formed from composite materials, such as carbon fiber composites having unidirectional fibers and/or fabrics as reinforcement and resins such as epoxy and polyimide as matrix. Further, in some embodiments, the composite materials can include thermoplastic polymers such as PEEK, PPS, polyamide and polyimide. Further, other fibers, such as aramid and glass fibers, may also be used for mitigating corrosion risk between metal and carbon. Light weight titanium, aluminum and magnesium alloys may be metallic material candidates, for example. In this configuration, the first material portion 514 includes a hub flange 518, formed from the same material as the first material portion 514. Also shown in this configuration is an inner sleeve 520 which may be formed from a composite material, the same or different from the material of the second material portion 516. In this embodiment, because the second material portion 516 is arranged as the outer diameter of the second rotor sleeve 502, an outer sleeve may be omitted. However, in other embodiments, an outer sleeve similar to that shown in with respect to the configuration of the first rotor sleeve 500 may be employed.

A third rotor sleeve 504, shown in FIG. 5A, is formed from two separate materials. In this configuration, the third rotor sleeve 504 includes a first material portion 522 and a second material portion 524. In a non-limiting embodiment, the first material portion 522 may be formed from metal and the second material portion 524 may be formed from composite materials, such as carbon fiber composites. In this configuration, the first material portion 522 includes a hub flange 526, formed from the same material as the first material portion 522. Also shown in this configuration is an inner sleeve 528 which may be formed from a composite material, the same or different from the material of the second material portion 524. In this embodiment, because the second material portion 524 is arranged as the outer diameter of the third rotor sleeve 504, an outer sleeve may be omitted. However, in other embodiments, an outer sleeve similar to that shown in with respect to the configuration of the first rotor sleeve 500 may be employed.

In the configuration of the first rotor sleeve 500, a single material is used to form a substantially U-shaped cross-sectional geometry with a U-shaped channel defined therein. The U-shaped channel is sized and shaped to receive U-shaped magnets as shown and described above. The second material parts (inner sleeve 508 and outer sleeve 510) may provide for increased structural support to the ring-shaped or annular structure of the first rotor sleeve 500. In the configuration of the second rotor sleeve 502, two substantially J-shaped pieces (first material portion 514 and second material portion 516) may be joined to form the second rotor sleeve 502. The joining of the first material portion 514 to the second material portion 516 may be by, for example, welding, bonding, adhesives, mechanical connection (e.g., brackets, fasteners, and the like), etc., as will be appreciated by those of skill in the art. In the configuration of the third rotor sleeve 504, a substantially J-shaped first material portion 522 is connected to a substantially i-shaped or l-shaped second material portion 524.

In FIG. 5B, a fourth rotor sleeve 550 is shown having a substantially U-shape and is formed as a continuous material or unitary piece. As such, an inner diameter wall 556, a connecting wall 558, and an outer diameter wall 560 are all formed as a single, continuous piece or structure. A fifth rotor sleeve 552, shown in FIG. 5B, is formed of three separate pieces 562, 564, 566. When the pieces 562, 564, 566 of the fifth rotor sleeve 552 are joined together, they will form a substantially U-shaped rotor sleeve. The joining of the pieces 562, 564, 566 may be by welding, bonding, fastener, adhesive, or the like, as will be appreciated by those of skill in the art. A sixth rotor sleeve 554, shown in FIG. 5B, is formed of three separate pieces 568, 570, 572. When the pieces 568, 570, 572 of the fifth rotor sleeve 554 are joined together, they will form a substantially open box-shaped rotor sleeve. In this embodiment, an inner diameter wall 568, a connecting wall 570, and an outer diameter wall 572 may be joined to form a box-like rotor sleeve. In this configuration, there is no rounded corners, which may aid in manufacturing, joining, assembly and the like. The sixth rotor sleeve 554 may house a U-shaped magnet, with empty corner present or filled with a filler or support material or may house a box-shaped magnet structure that is substantially similar in geometry as the sixth rotor sleeve 554. The joining of the pieces 568, 570, 572 may be by welding, bonding, fastener, adhesive, or the like, as will be appreciated by those of skill in the art.

It will be appreciated that the configurations in FIGS. 5A-5B are merely for example and other arrangements of the material, pieces, and/or components for the rotor sleeve may be employed without departing from the scope of the present disclosure.

In each of the embodiments of FIG. 5A, the rotor sleeves 500, 502, 504 include a hub flange 512, 518, 526. The hub flange 512, 518, 526 may be directly cast, machined, or otherwise formed with the respective portions of the rotor sleeves 500, 502, 504. In some embodiments, the hub flange 512, 518, 526 may be manufactured separately from the rotor sleeves and may be affixed by known means, such as welding, bonding, and the like. It will be appreciated that similar hub flanges may be incorporated onto the rotor sleeves illustratively shown in FIG. 5B.

Figure 6A:
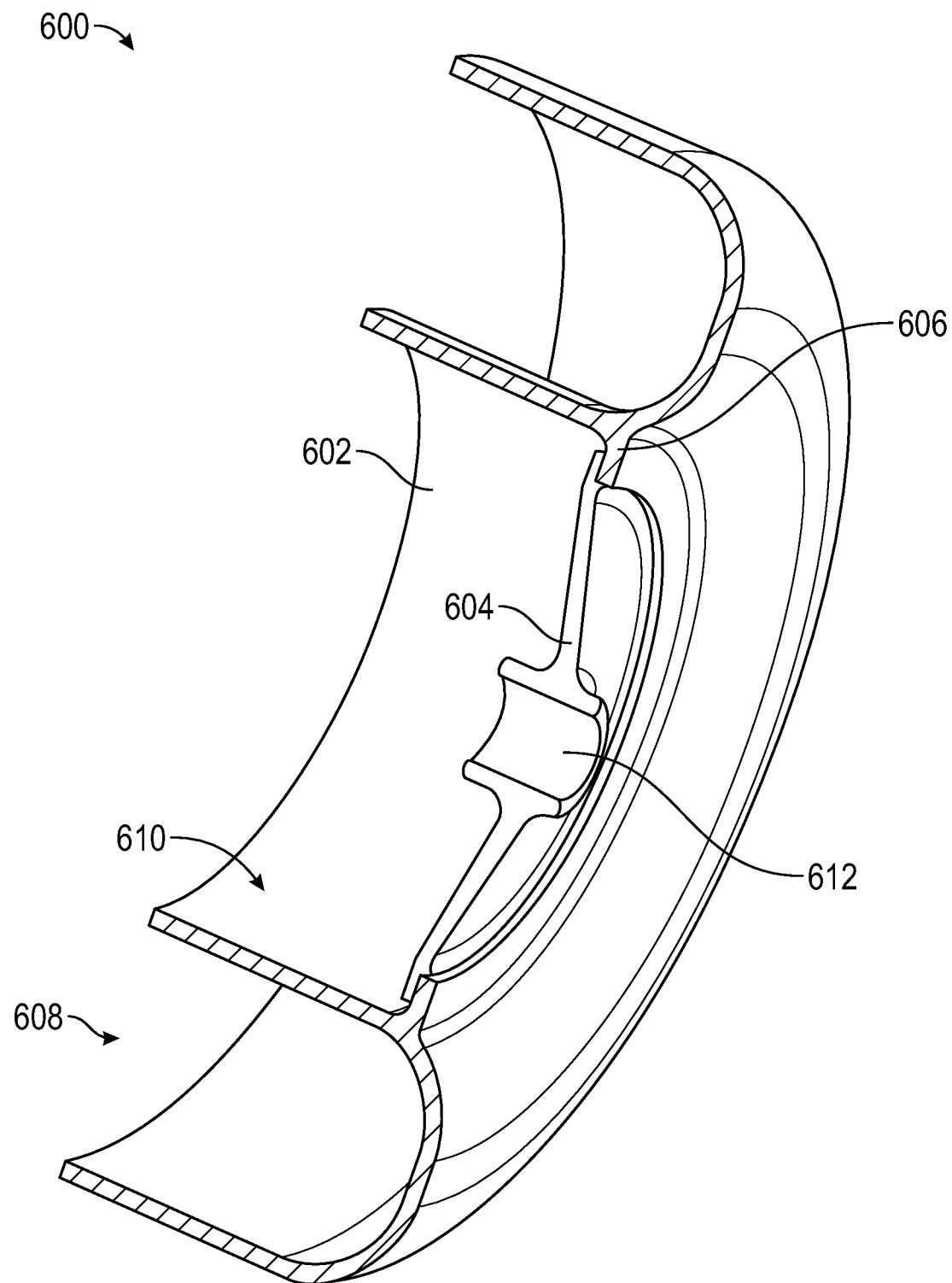
FIG. 6A is a schematic illustration of a rotor sleeve and hub in accordance with an embodiment of the present disclosure.

Turning now to FIG. 6A, a schematic illustration of a sleeve and hub assembly 600 for an aircraft electric motor in accordance with an embodiment of the present disclosure is shown. The sleeve and hub assembly 600 includes a rotor sleeve 602 and a hub 604. The rotor sleeve 602 as shown is a single material configuration, although other configurations, as shown and described herein, may be used without departing from the scope of the present disclosure. The rotor sleeve 602 includes a hub flange 606 that extends radially inward from an inner portion of the rotor sleeve 602. The hub flange 606 is configured to receive the hub 604 and fixedly and securely connect the hub 604 to the rotor sleeve 602.

The rotor sleeve 602 defines a U-shaped channel 608 for receiving a rotor and stator assembly, as shown and described herein. The rotor sleeve 602 also defines a sleeve inner cavity 610 defined radially inward from the U-shaped channel 608, which is an annular structure. The hub 604 is arranged within the sleeve inner cavity 610 and is configured to connect the rotor sleeve 602 to a gear assembly that is housed within the sleeve inner cavity 610. The hub 604 includes a central bore 612 for receiving or engaging with a shaft (e.g., a high speed shaft or, for example, the first shaft 220 shown in FIGS. 2C-2D). In some embodiments, the shaft may be integrally formed with the hub 604. In other embodiments, the central bore 612 may be provided for engagement with the shaft, such as by a toothed connection, a threaded connection, welding, bonding, or the like.

Figure 6B:
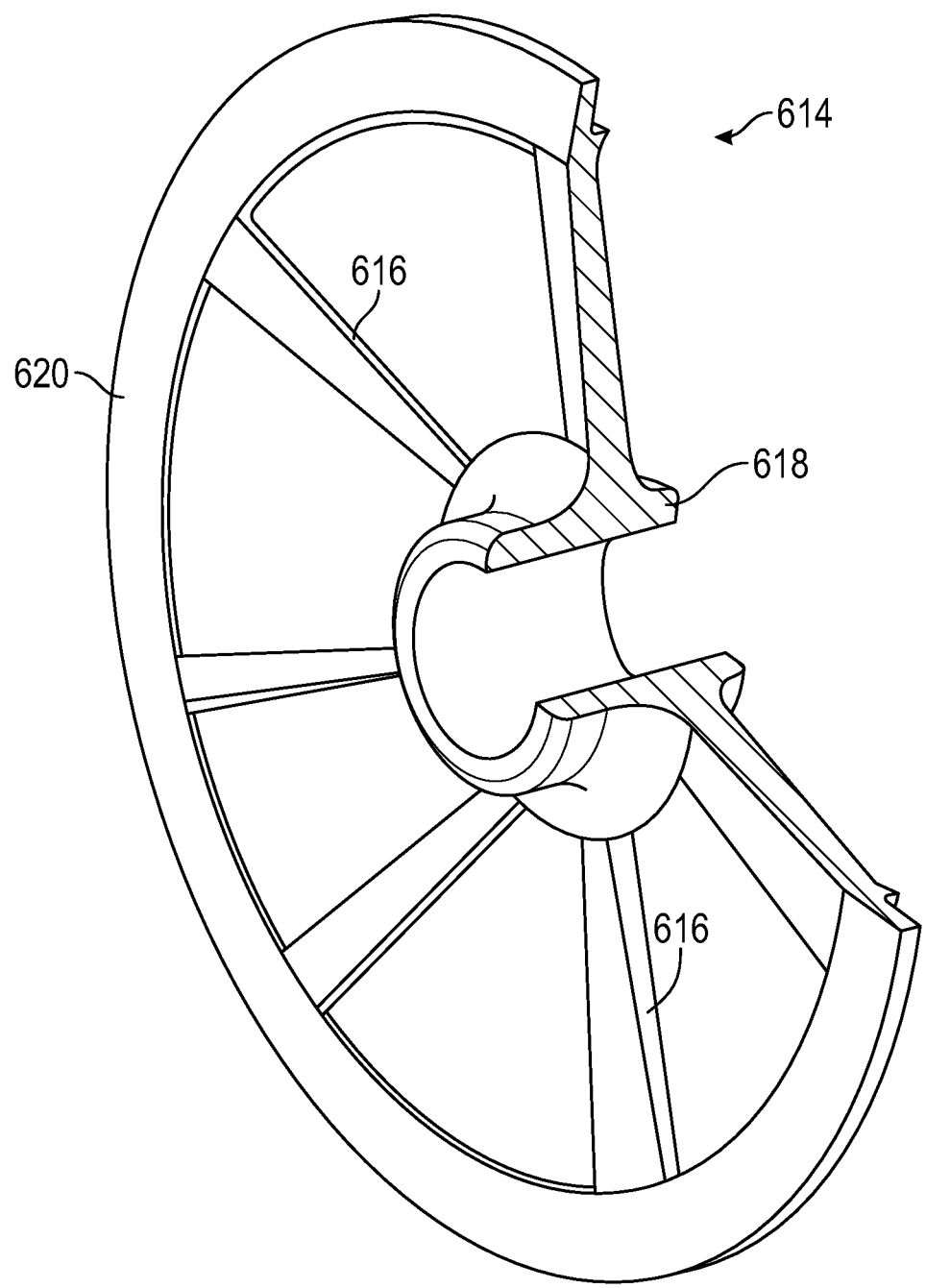
FIG. 6B illustrates an alternative configuration of a hub in accordance with an embodiment of the present disclosure.

FIG. 6A illustrates a solid body hub 604. However, alternative configurations are possible, which may provide for reduced weight, such as a spoke-style hub 614, as shown in FIG. 6B. The spoke hub 614 includes a plurality of spokes 616 extending between an inner element 618 and an outer element 620 of the hub 614. In such spoke-type configuration, the inner element 618 may be configured to engage with a first, input, or high speed shaft of an aircraft electric motor, and the outer element 620 may be configured to engage with a portion of a rotor sleeve, such as the hub flange 606 of the rotor sleeve 602 shown in FIG. 6A.

As noted above, in some embodiments of the present disclosure, the rotor sleeve may be formed from metal, composite materials, or combinations thereof Similarly, the hub may also be formed from metal, composite materials, or combinations thereof.

In the above description of the rotor sleeve and hub (FIGS. 4-6), a U-shaped rotor sleeve may be employed with an inner sleeve to house and support magnets of the rotor of an aircraft electric motor. The rotor sleeve, the inner sleeve, and the hub are configured to rotate together at high speed. The torque is transferred through the flange/hub to a shaft of the motor (e.g., first shaft 220 shown in FIGS. 2C-2D). The full U-shaped sleeve design, shown in FIG. 4, configuration 500 of FIG. 5, and FIG. 6, presents the most integrated design and because of the compounded curvature, may require highly drapeable composite sheet material such as carbon fiber fabrics and/or braided materials. However, as shown and described, the U-shaped rotor sleeve may be broken down into two or more parts. For example, in the configuration 502, two halves may be arranged in a mirrored J-shape. The J-shaped design may reduce some of the cantilever load from centrifugal forces caused by high speed rotation. The inclusion of an inner sleeve (e.g., inner sleeve 324 shown in FIG. 3B, or inner sleeves 508, 520, 528 of FIG. 5), the inner half J-shaped sleeve may have less structural load and its weight may be reduced further. Furthermore, the J-shape design can be more easily constructed using composite materials. Alternatively, in other embodiments, the U-shaped sleeve may be formed into three pieces. In such a configuration, two rings may be joined by a straight section/plate. That is, with reference again to FIG. 4, the inner diameter wall 402, the connecting wall 404, and the outer diameter wall 406 may each be separately manufactured and then joined together to form the rotor sleeve 400.

As described above, the gear assembly may be integrated or embedded within the aircraft electric motor in accordance with embodiments of the present disclosure. In accordance with some embodiments of the present disclosure, an embedded high power density planetary gearbox provides an improved component of an electric drive train (EDT) for a quiet, safe, reliable and efficient electrified aircraft propulsion (EAP) system. The gearbox reduces the input speed from the motor to drive a propeller, ensuring a desired combined efficiency of controlling electromagnetic, thermo-mechanical, and aerodynamic processes.

As noted above, an independent, conventional gearbox increases the system weight and size and thus cancels out the intended EAP economic benefits. In addition, such larger systems may be associated with higher propeller tip speed and more trapped air, inducing abnormal noise. In accordance with embodiments of the present disclosure, a planetary gearbox is embedded into the motor structure and combines bi-material or hybrid gear design and manufacturing and carbon fiber reinforced polymer matrix composite (CF-PMC) structure and connections to maximize system power density and efficiency. Such embedded gear box may be implemented within the sleeve inner cavity of the rotor sleeves described above.

Embodiments described herein provide for improved sleeve and flange/hub arrangements for use in aircraft electric motors. As shown and described above, the U-shaped rotor sleeve, along with an internal ring sleeve, can house and support magnets of the rotor and these components can rotate together at high speed. The torque is transferred through the flange/hub to the motor shaft (e.g., first shaft). In accordance with various embodiments, full U-shaped sleeve designs, mirrored J-shape designs, or other segmented configurations may be employed. The segmented configurations (J-shape or otherwise) may reduce some of the cantilever load from centrifugal forces caused by high speed rotation, as compared to a full U-shape configuration, for example.

In accordance with embodiments of the present disclosure, an integrated planetary gearbox is arranged inside the rotor sleeve with a sun gear operably connected to an input shaft which is connected to the high-speed U-shaped rotor sleeve, such as shown and described above. The U-shaped rotor sleeve may include a hybrid CF-PMC/titanium structure (e.g., the components of the rotor sleeve, hub, etc.). In accordance with some embodiments, lightweight gears for the gear assembly can be, for example, hybrid gears made out of high strength material for the tooth rim and the balance made out of symmetric low density, high strength composite ply layups for the web. In another configuration, such lightweight gears may be bi-metal gears made from a high toughness and thermal resistance alloy, such as Ferrium C64, and a lightweight alloy. The gear design will be optimized based on the manufacturing option. The gearbox housing and flange/hub can be made out of CF-PMC to provide improved specific strength and stiffness and reduce the weight by 30-40% as compared to a conventional gear assembly. A hybrid CF-PMC/titanium structure may be used to hold the cantilever rotor and connect to the gearbox sun gear shaft (first or input shaft). In some embodiments, the gearbox or gear assembly may be jet-sprayed cooled with heat rejected to ram air in a dedicated heat-exchanger. Further, in some embodiments, cooling fluid may be channeled through a cooling system described above and through part of the gearbox, thus forming a closed-loop or substantially closed-loop cooling cycle.

Figure 7A:
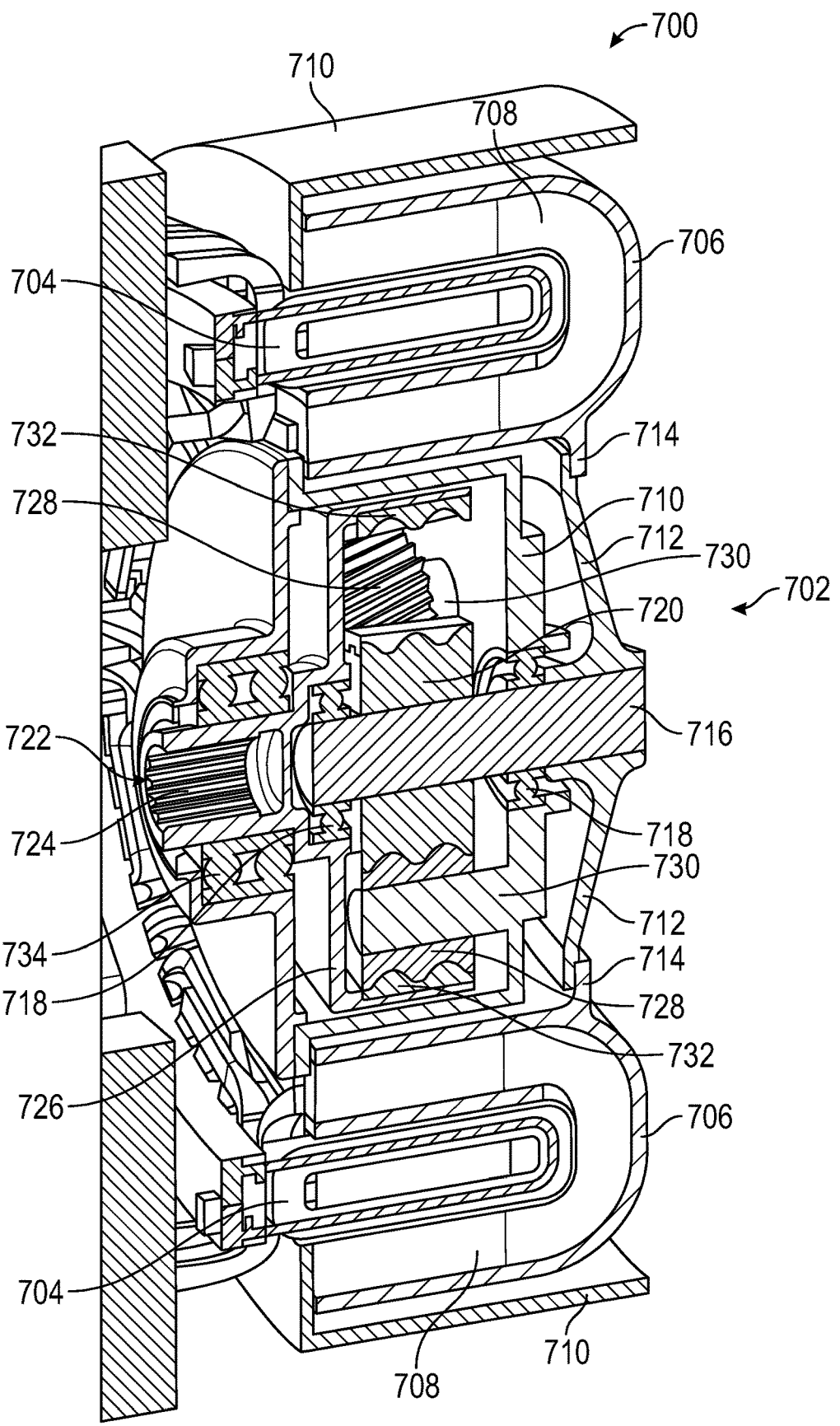
FIG. 7A is a schematic illustration of an aircraft electric motor in accordance with an embodiment of the present disclosure.
Figure 7B:
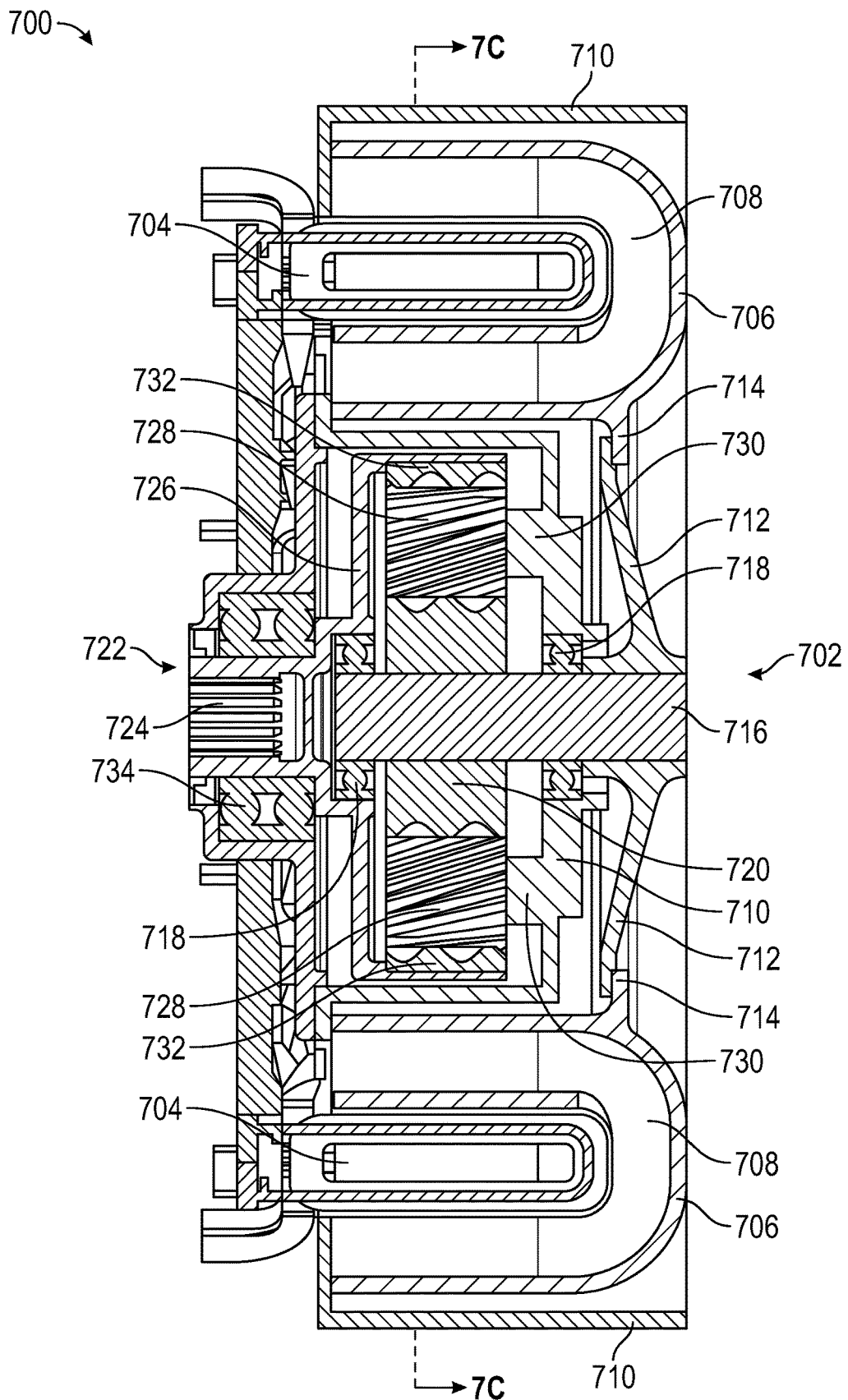
FIG. 7B is an alternative view of the aircraft electric motor of FIG. 7A.
Figure 7C:
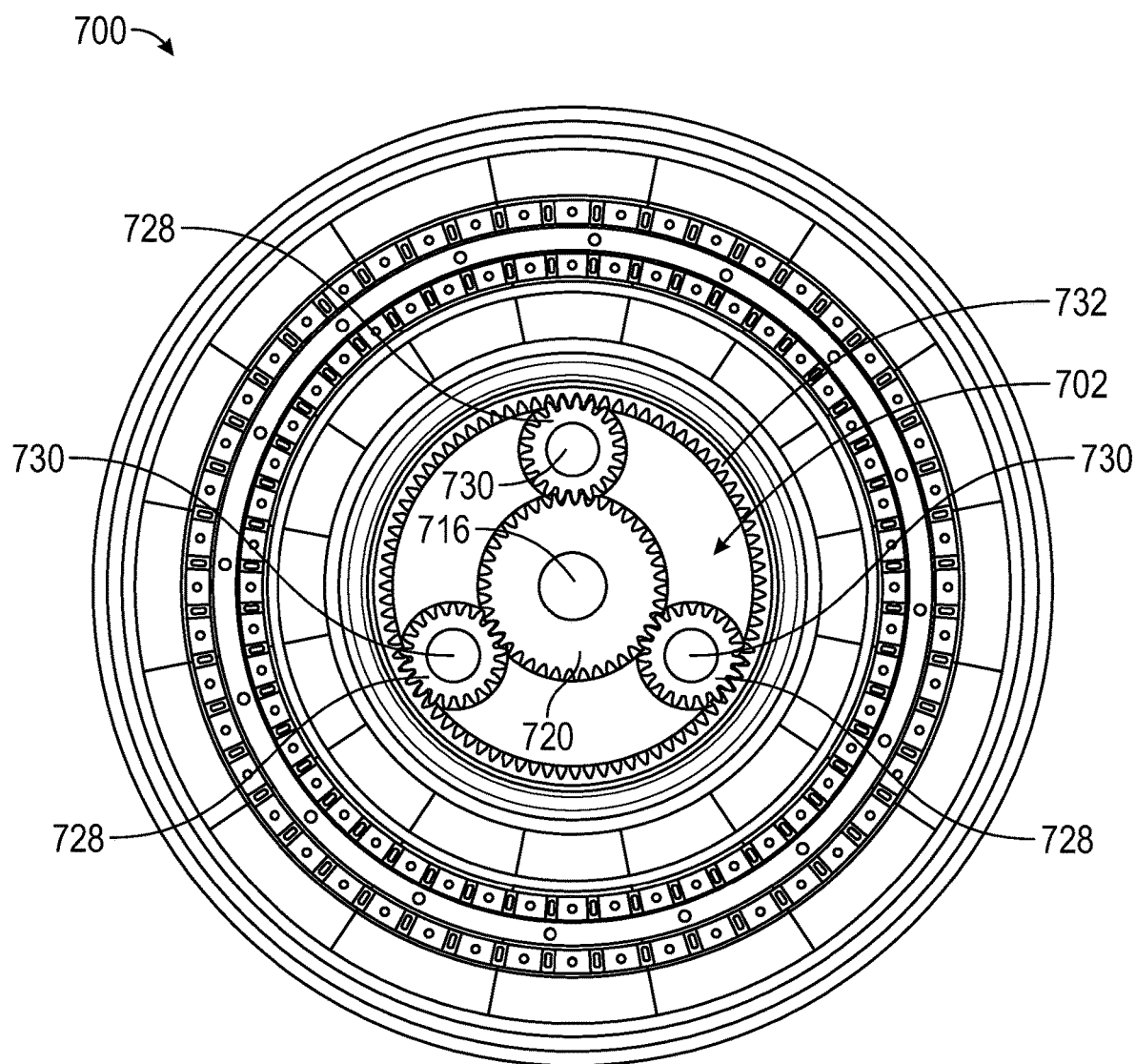
FIG. 7C is a front elevation cross-sectional view of the aircraft electric motor of FIG. 7A as viewed along the line C-C shown in FIG. 7B.
Figure 7D:
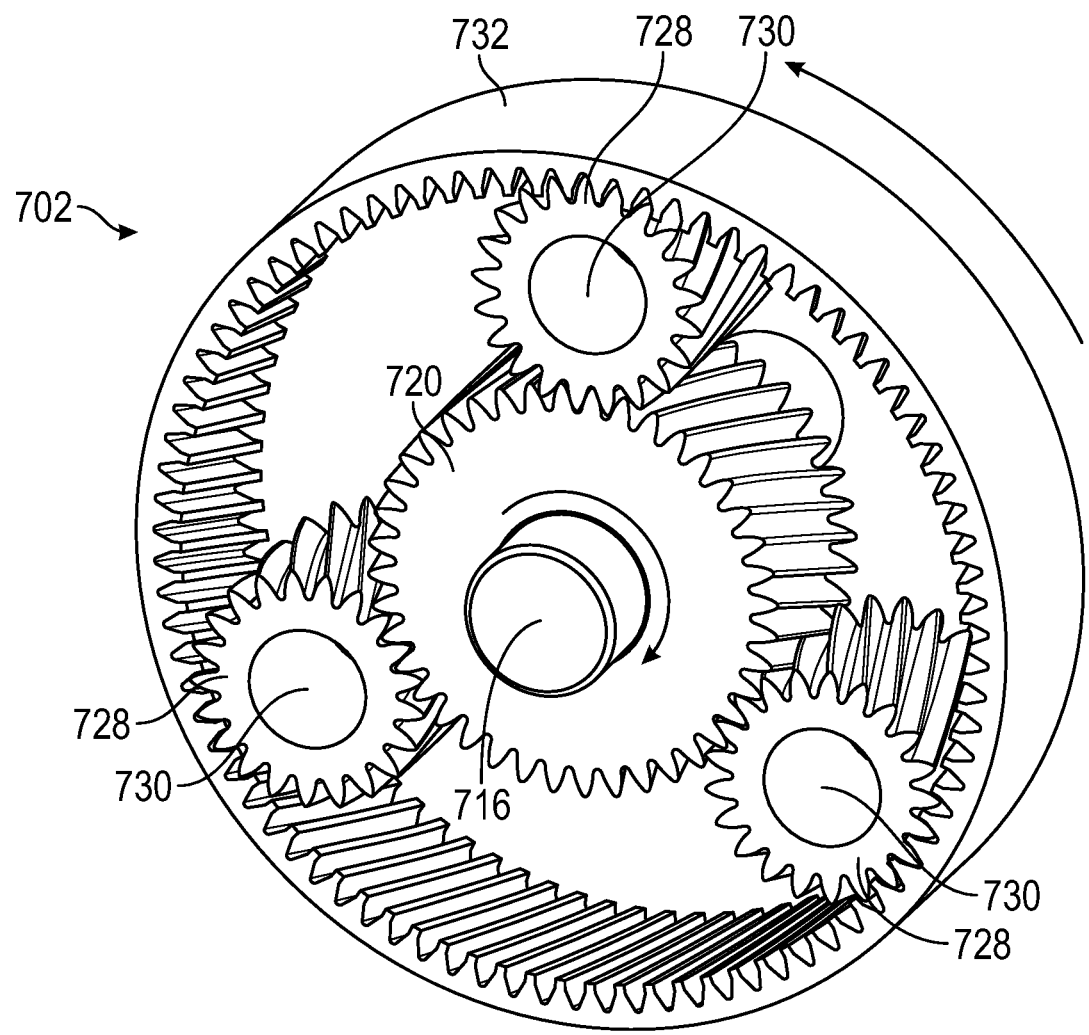
FIG. 7D is a schematic illustration of a gear assembly of the aircraft electric motor of FIG. 7A.
Figure 7E:
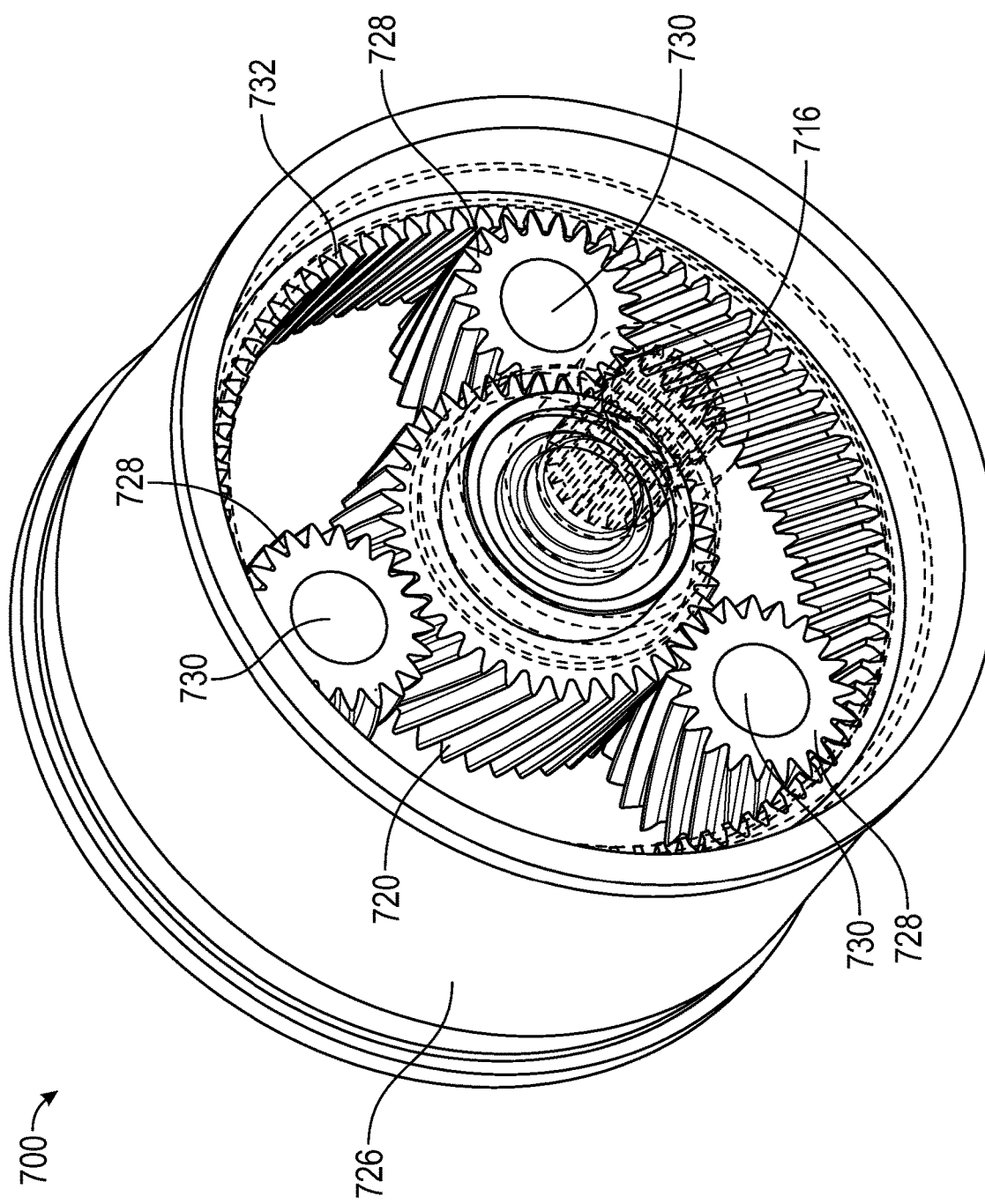
FIG. 7E is an alternative view of the gear assembly of the aircraft electric motor of FIG. 7A.

Turning now to FIGS. 7A-7E, schematic illustrations of an aircraft electric motor 700 having a gear assembly 702 in accordance with an embodiment of the present disclosure are shown. FIGS. 7A-7C illustrate partial views of the aircraft electric motor 700 and FIGS. 7D-7E illustrate the gear assembly 702 in isolation separate from the rest of the components of the aircraft electric motor 700.

The aircraft electric motor 700 includes a stator 704, such as shown and described above, and a rotor formed of a rotor sleeve 706 and U-shaped magnets 708 arranged therein where are arranged within a motor housing 710. A hub 712 is fixedly connected to the rotor sleeve 706 at a hub flange 714. The hub 712 is fixedly connected to or integrally formed with a first shaft 716. The first shaft 716 may be an input shaft that is rotationally driven by rotation of the rotor sleeve 706 which is caused to rotate due to electromagnetic interaction between the U-shaped magnets 708 of the rotor and the stator 704 which may receive electrical current from one or more power module systems, as described above.

The first shaft 716 is fixedly attached to the hub 712, supported on first bearings 718, and operably or fixedly connected to a sun gear 720. The first bearings 718 rotationally isolate the first shaft 716 relative to the motor housing 710 and a second shaft 722. The second shaft 722 includes a shaft element 724 and a shaft body 726, described further herein. The engagement between the first shaft 716 and the sun gear 720 may be by bonding, welding, or other joining process/method or may be a mechanical connection, such as through a toothed or slot-groove connection, for example.

The sun gear 720 is a toothed component that is configured to engage and operate with one or more planetary gears 728. The planetary gears 728 are mounted to a portion of the motor housing 710. For example, as shown in this embodiment, the planetary gears 728 are mounted and supported on gear shafts 730 that are integral components or parts of the motor housing 710. As the first shaft 716 is rotationally driven, the sun gear 720 will be rotated, which will cause the planetary gears 728 to rotate relative to a ring gear 732. The ring gear 732 is fixedly or operably connected to the shaft body 726 of the second shaft 722. As such, as the ring gear 732 is caused to rotate by interaction with the planetary gears 728, the shaft body 726 will be rotated, which in turn causes the shaft element 724 of the second shaft 722. The second shaft 722 may be an output shaft that is operably connected to a fan shaft or other component to impart rotationally movement thereto. The shaft element 724 of the second shaft 722 may be rotationally supported on second bearings 734.

As illustratively shown, the gear assembly 702 is arranged as a concentric or substantially planar assembly providing for a low profile or compact configuration such that the entire gear assembly 702 is substantially housed within the motor housing 710. Further, as shown, the gear assembly 702 is arranged within the sleeve inner cavity of the rotor sleeve 706. As such, a very compact electric motor for an aircraft may be achieved through the gear assembly configuration of the present disclosure. The gear assemblies of the present disclosure can provide improved power density, increased efficiency, noise reduction, robust performance, and improved reliability as compared to prior gear assembly systems.

In accordance with some embodiments, high power density gears may be incorporated. In some embodiments, hybrid gears made out of or formed from high strength material for the tooth rim and the balance or rest of the gear structure may be formed out of symmetric low density, high strength composites. Such symmetric low density, high strength composites may include, without limitation, carbon fiber reinforced polymer matrix composite ply layups for the web. In such configurations, using advanced composite material(s) in hybrid gears can lighten the weight of the gear assembly (and motor) while ensuring the level of torque transfer compared to an all-metallic gearing configuration. In other embodiments, high power density gears may be formed using a model-based design of bi-metal gears made from a high toughness and thermal resistance alloy(s), such as, but not limited to, Ferrium C64 and a lightweight alloy. In these configurations, weight reduction may be provided from the introduction of a lightweight gear web through topology optimization and possible additive manufacturing.

Figure 8:
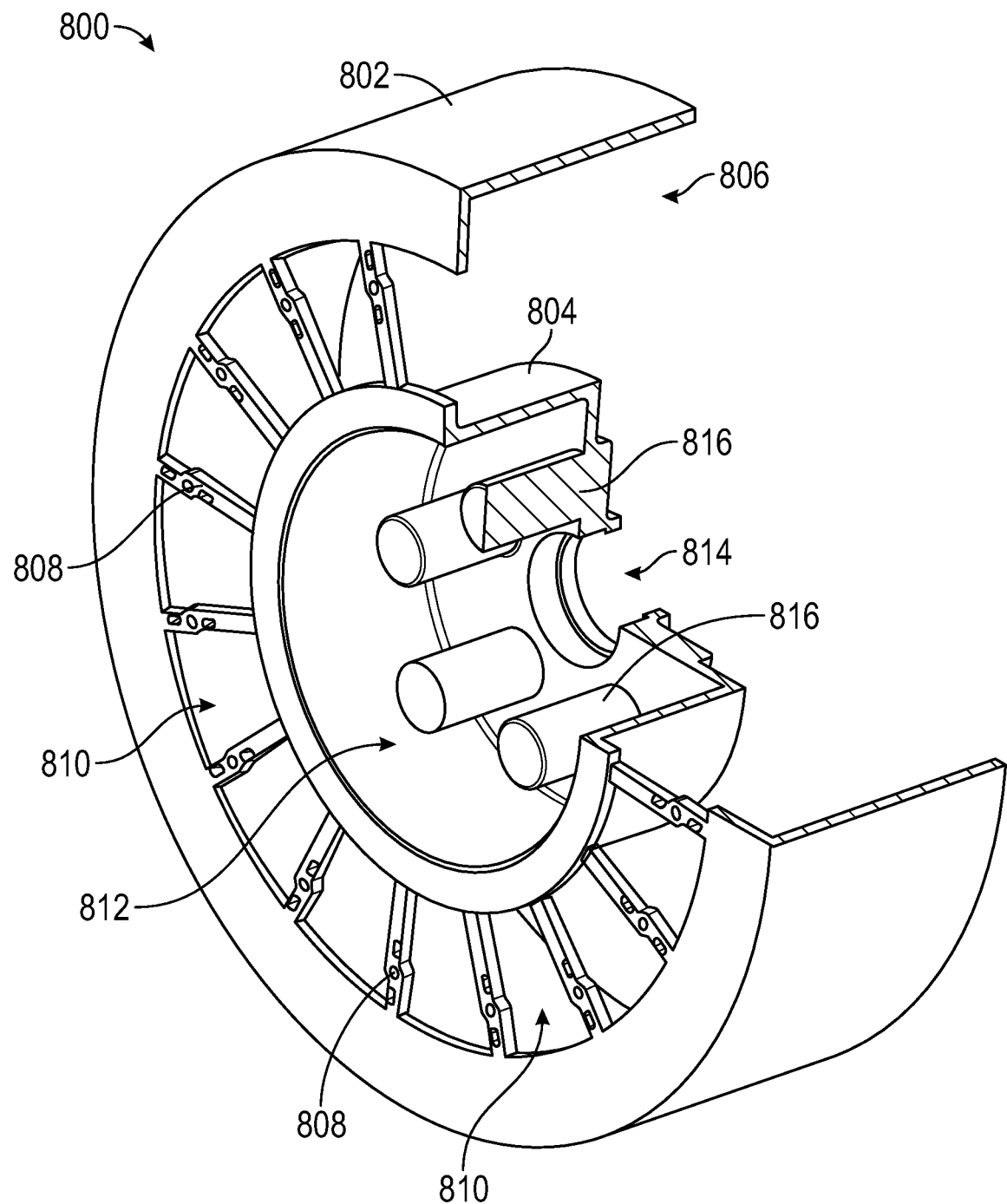
FIG. 8 is a schematic illustration of a motor housing of an aircraft electric motor in accordance with an embodiment of the present disclosure.

As shown and discussed above, the components of the aircraft electric motors are housed, at least partially, within a motor housing. FIG. 8 is a schematic illustration of a motor housing 800 in accordance with an embodiment of the present disclosure. The motor housing 800, in some embodiments, may be a single, unitary body that is machined, cast, molded, or otherwise manufactured as a single component of a single material. The motor housing 800 includes an outer wall 802 and an inner wall 804. The motor housing 800 is circular in shape and the inner wall 804 is arranged radially inward from the outer wall 802. A rotor-stator cavity 806 is defined between the outer wall 802 and the inner wall 804. The outer wall 802 may be connected to the inner wall 804 by a plurality of connectors 808. The connectors 808 define access apertures 810 between circumferentially adjacent connectors 808. The access apertures 810 are configured to enable electrical and cooling connections from power systems and/or cooling systems a stator arranged within the rotor-stator cavity 806. The diameter of the inner wall 804 is sized to fit within a sleeve inner cavity of a rotor sleeve and the diameter of the outer wall 802 is sized to receive the rotor sleeve between the inner wall 804 and the outer wall 802.

The inner wall 804 defines a gear assembly cavity 812. The gear assembly cavity 812 is configured to receive a gear assembly of the aircraft electric motor. The motor housing 800 includes a shaft aperture 814 for receiving, for example, a first shaft or input shaft of the aircraft electric motor. The motor housing 800 also includes gear shafts 816 that are configured to receive gears of the gear assembly (e.g., planetary gears). As shown, in this configuration, access to the rotor-stator cavity 806 and the gear assembly cavity 812 are from opposite sides of the motor housing 800. This directional configuration can aid in arrangement and engagement of components of the aircraft electric motor, as shown and described above.

Figure 9:
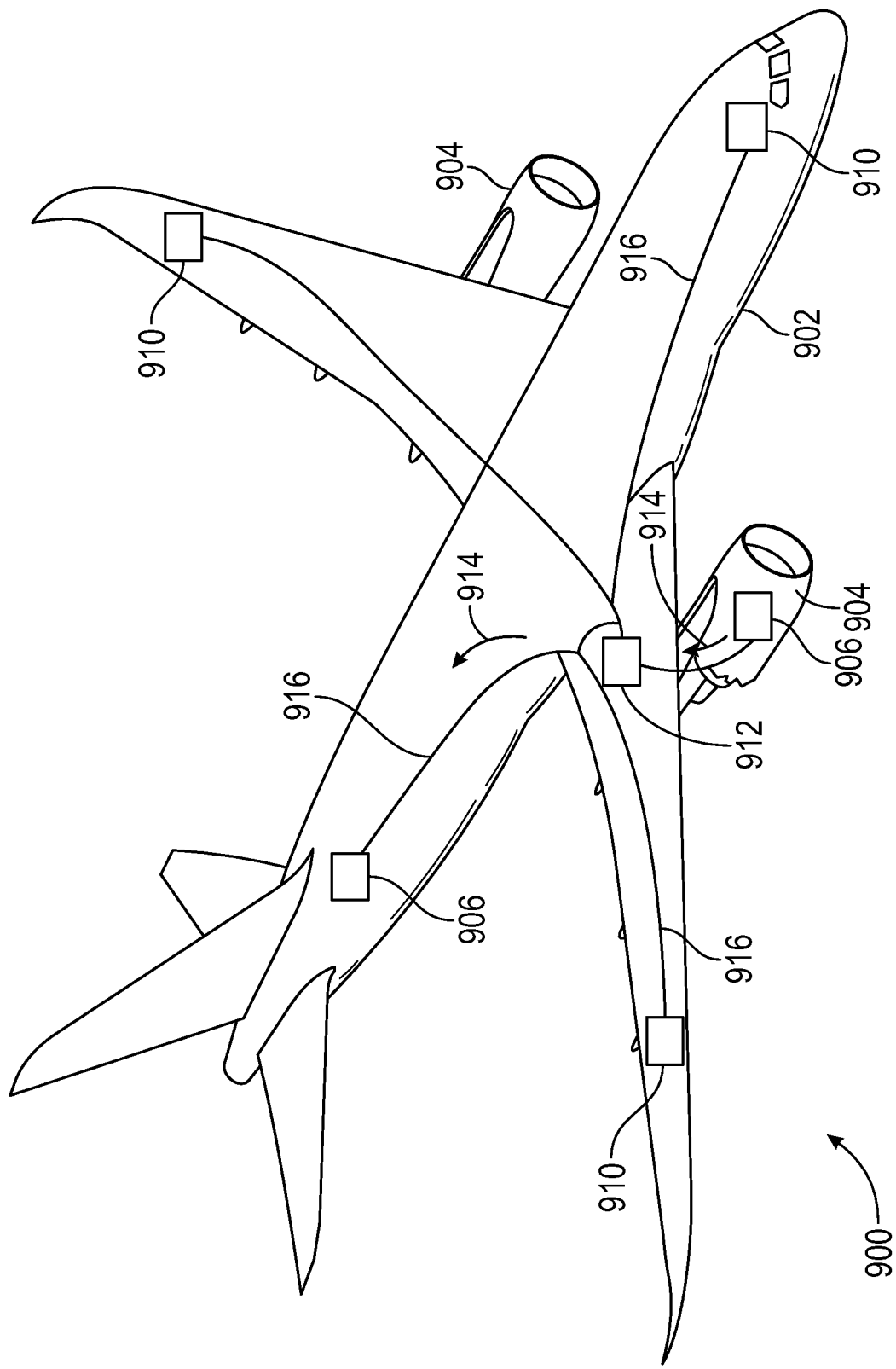
FIG. 9 is a schematic view of a power system of an aircraft that may employ embodiments of the present disclosure.

Referring to FIG. 9, a power system 900 of an aircraft 902 is shown. The power system 900 includes one or more engines 904, one or more electric motors 906, a power bus electrically connecting the various power sources 904, 906, and a plurality of electrical devices 910 that may be powered by the engines 904 and/or motors 906. The power system 900 includes a power distribution system 912 that distributes power 914 through power lines or cables 916. The electric motors 906 be configured as the aircraft electric motors shown and described above.

Advantageously, embodiments of the present disclosure provide for improved electric motors for aircraft and aviation applications. The aircraft electric motors of the present disclosure may include a high-speed (e.g., 15000 RPM) rotor with U-shaped high-strength magnets. This configuration enables maximization of the coil and magnet utilization, therefore maximizing torque density. The gear assemblies of the present disclosure are integrated inside the rotor structure along with bearings on both high-speed (e.g., first or input) and low-speed (e.g., second or output) shafts. In some embodiments, distributed drive is arranged in close proximity to the motor winding terminal. Further, in accordance with some embodiments, Litz wires may be wound around stacked ring laminations that incorporate embedded cooling channels alongside the motor windings. Such windings may be supported by ceramic stator teeth with additional embedded channels. Additionally, in some embodiments, an integrated flow header, located between the motor and drive, can provide thermal management to the system.

As described herein, embodiments of the present disclosure may provide for light-weight components. The lightweight materials, described above, can be used to form the specifically described components of the motor and/or other parts/components of the motors described herein. It will be appreciated that composite materials of the present disclosure can include, without limitation, composite with woven fabric, composite with braided fabric, composite with carbon fiber, composite with glass fiber, composite aramid fiber, composite with multiple type of fibers, composite with short fibers, and/or composite with continuous fibers. Such composite materials may be incorporated into system that also use metals which may include, without limitation, titanium, titanium alloys, aluminum, aluminum alloys, iron, stainless steel, Inconel. It will be appreciated that other metals and/or composite materials may be employed without departing from the scope of the present disclosure.

The terms "about" and "substantially" are intended to include the degree of error associated with measurement of the particular quantity based upon the equipment available at the time of filing the application. For example, "about" or "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft electric motor comprising:
   a substantially annular shaped motor housing having an outer wall and an inner wall, wherein a rotor-stator cavity is defined between the outer wall and the inner wall and a gear assembly cavity is defined radially inward from the inner wall of the motor housing;
   an annular rotor sleeve arranged within the rotor-stator cavity, the rotor sleeve having a sleeve inner wall, a sleeve curved connecting wall, and a sleeve outer wall, wherein the sleeve inner wall, the sleeve curved connecting wall, and the sleeve outer wall define a U-shaped channel configured to receive a U-shaped magnet structure and a sleeve inner cavity is defined radially inward from the sleeve inner wall, wherein the sleeve curved connecting wall is defined by a compound curvature;

a gear assembly arranged within the gear assembly cavity and radially inward from the sleeve inner wall, the gear assembly comprising:
   a sun gear operably connected to a first shaft;
   at least one planetary gear arranged radially outward from the sun gear and rotationally engaged with the sun gear; and
   a ring gear arranged radially outward from the at least one planetary gear and rotationally engaged with the at least one planetary gear, wherein the ring gear is operably connected to a second shaft;

a hub connector extending radially inward from a point between the sleeve inner wall and the sleeve curved connecting wall and into the sleeve inner cavity; and a hub arranged in the sleeve inner cavity and fixedly connected to the hub connector, wherein the hub is configured to rotate with rotation of the rotor sleeve, the hub being operably coupled to the first shaft.

2. The aircraft electric motor of claim 1, wherein the hub comprises a composite material structure.

3. The aircraft electric motor of claim 1, wherein the hub comprises a plurality of spokes extending between an inner element and an outer element, wherein the outer element is configured to engage with the rotor sleeve and the inner element is configured to engage with the first shaft.

4. The aircraft electric motor of claim 1, further comprising a U-shaped magnet structure arranged within the U-shaped channel of the rotor sleeve.

5. The aircraft electric motor of claim 1, wherein the rotor sleeve comprises a composite material structure.

6. The aircraft electric motor of claim 1, wherein the rotor sleeve comprises two pieces, with a first piece formed of a first material and the second piece formed of a second material different from the first material.

7. The aircraft electric motor of claim 1, further comprising a stator and a rotor arranged within the rotor-stator cavity of the motor housing.

8. The aircraft electric motor of claim 7, wherein the rotor is operably connected to the first shaft to drive rotation of the sun gear.

9. The aircraft electric motor of claim 7, wherein the rotor comprises a U-shaped magnet structure.

10. The aircraft electric motor of claim 9, wherein the stator is arranged within the U-shaped magnet structure.

11. The aircraft electric motor of claim 1, wherein the motor housing includes gear shafts within the gear assembly cavity, the gear shafts configured to support gears of the gear assembly.

12. The aircraft electric motor of claim 11, wherein the at least one planetary gear is supported on one of the gear shafts.

13. The aircraft electric motor of claim 1, wherein the first shaft is an input shaft configured to drive rotation of the sun gear and the second shaft is an output shaft configured to be rotationally driven by rotation of the ring gear.

14. The aircraft electric motor of claim 1, wherein the second shaft is operably connected to a fan of the aircraft.

15. The aircraft electric motor of claim 1, wherein the first shaft is rotationally supported on at least one first bearing and the second shaft is rotationally supported on at least one second bearing.

16. The aircraft electric motor of claim 1, wherein at least a portion of the gear assembly comprises a symmetric low density, high strength composite material.

17. The aircraft electric motor of claim 1, wherein at least one of the sun gear, the at least one planetary gear, and the ring gear comprise a bi-metal material construction.

\* \* \* \* \*